(12) United States Patent
Gaffney et al.

(10) Patent No.: US 11,910,761 B2
(45) Date of Patent: Feb. 27, 2024

(54) CUTTING TOOL

(71) Applicants: Peter J. Gaffney, Dearborn, MI (US);
Paul J. Yaldoo, Waterford, MI (US);
Mark W. Lamb, Hartland, MI (US)

(72) Inventors: Peter J. Gaffney, Dearborn, MI (US);
Paul J. Yaldoo, Waterford, MI (US);
Mark W. Lamb, Hartland, MI (US)

(73) Assignee: NE-CLONE L.L.C., Dearborn, MI (US)

( * ) Notice: Subject to any disclaimer, the term of this patent is extended or adjusted under 35 U.S.C. 154(b) by 199 days.

(21) Appl. No.: 17/362,836

(22) Filed: Jun. 29, 2021

(65) Prior Publication Data

US 2021/0400882 A1   Dec. 30, 2021

Related U.S. Application Data

(60) Provisional application No. 63/046,639, filed on Jun. 30, 2020.

(51) Int. Cl.
| *A01G 3/02* | (2006.01) |
| *A01G 3/08* | (2006.01) |
| *A01G 2/10* | (2018.01) |
| *A01G 2/35* | (2018.01) |

(52) U.S. Cl.
CPC .............. *A01G 3/021* (2013.01); *A01G 3/081* (2013.01); *A01G 2/10* (2018.02); *A01G 2/35* (2018.02)

(58) Field of Classification Search
CPC ........... B26B 27/00; B26B 17/00; A01G 3/02; A01G 3/021; A01G 3/081; A01G 2/10; A01G 2/35

USPC ..................... 30/121, 188, 249, 294, DIG. 3; 47/1.01 R
See application file for complete search history.

(56) References Cited

U.S. PATENT DOCUMENTS

| 187,365 | A | * | 2/1877 | Doyle | ..................... B26B 27/00 30/290 |
| 673,375 | A | * | 5/1901 | Bayha | ..................... B43M 7/002 30/DIG. 3 |
| 737,768 | A | * | 9/1903 | Preston | ..................... B26B 27/00 30/294 |

(Continued)

FOREIGN PATENT DOCUMENTS

| CA | 1165992 A | * | 4/1984 | ............. B26B 27/00 |
| DE | 385088 C | * | 12/1923 | ............... A01G 2/35 |
| DE | 1145849 B | * | 3/1961 | ............... A01G 2/35 |

*Primary Examiner* — Jason Daniel Prone
(74) *Attorney, Agent, or Firm* — Mastrogiacomo PLLC; Patrick Mastrogiacomo, Jr.

(57) ABSTRACT

A cutting tool includes a body formed by a first wall, a second wall, and a third wall, extending outward from a base. The first wall, second wall, third wall and the base define a trough in the body. The cutting tool further includes a blade holder in the trough, the blade holder pivotally engaged to the body, a strut assembly in the trough, the strut assembly pivotally engaged to the blade holder and pivotally engaged to the body, a blade in the blade holder, a blade channel in the body and extending through a third wall so as to receive the blade, at least one angled body channel in the body and wherein the blade holder is pivotable relative to the body to enable the blade to cut through a plant stem or tree branch present in the blade channel and the at least one angled body channel.

11 Claims, 27 Drawing Sheets

(56) References Cited

U.S. PATENT DOCUMENTS

| | | | | |
|---|---|---|---|---|
| 1,009,342 | A | * | 11/1911 | Rau, Jr. ............... B26B 27/00 30/234 |
| 2,254,738 | A | * | 9/1941 | Gamache ............... B26B 17/00 30/175 |
| 2,533,657 | A | * | 12/1950 | Wolfe ..................... A01G 2/35 30/172 |
| 2,681,504 | A | * | 6/1954 | Fox .......................... A01G 5/00 47/1.01 R |
| 2,806,325 | A | * | 9/1957 | Fox .......................... A01G 5/00 47/1.01 R |
| 3,659,343 | A | * | 5/1972 | Straus .................... B26B 13/18 30/179 |
| 3,911,577 | A | * | 10/1975 | Nickel ................. A63B 57/203 30/241 |
| 3,969,843 | A | | 7/1976 | Wahler et al. |
| 4,014,132 | A | | 3/1977 | Cook |
| 4,053,979 | A | * | 10/1977 | Tuthill .................... B26B 13/18 30/124 |
| 4,124,937 | A | * | 11/1978 | Gaughf, Jr. ............ B26B 27/00 30/229 |
| 4,531,290 | A | | 7/1985 | Piesa |
| 4,711,031 | A | * | 12/1987 | Annello ................. B26B 27/00 30/DIG. 3 |
| 5,007,171 | A | * | 4/1991 | Horning, Jr. ............. B67B 7/30 30/DIG. 3 |
| D414,665 | S | * | 10/1999 | Longo ............................. D8/60 |
| 6,148,560 | A | | 11/2000 | Hagen et al. |
| 6,918,205 | B1 | * | 7/2005 | Sowinski ................. A01G 2/35 30/286 |
| 7,073,264 | B2 | * | 7/2006 | Votolato .................. B26B 27/00 30/294 |
| 7,730,620 | B1 | * | 6/2010 | Anastasi ............... B26B 27/005 30/294 |
| 8,429,825 | B2 | * | 4/2013 | Johanson .............. B26B 27/005 30/294 |
| D714,124 | S | * | 9/2014 | Fujino .................. B26B 27/005 D8/98 |
| D736,050 | S | * | 8/2015 | Barouch ........................ D8/52 |
| 9,179,604 | B2 | | 11/2015 | Adams |
| D747,169 | S | * | 1/2016 | Koresh .................... A01G 5/00 D8/98 |
| 9,914,227 | B2 | * | 3/2018 | Greadington ........... B26B 17/00 |
| 11,212,965 | B1 | * | 1/2022 | Hames .................. A01G 3/081 |
| D948,973 | S | * | 4/2022 | Dorton ............................ D8/5 |
| 11,399,469 | B2 | * | 8/2022 | Dorton ..................... A01G 3/02 |
| 2004/0078983 | A1 | * | 4/2004 | Birebent ................. A01G 2/35 30/254 |
| 2015/0231014 | A1 | * | 8/2015 | Capobianco ............. B25F 1/00 7/151 |
| 2018/0368333 | A1 | | 12/2018 | Dorton |
| 2020/0084974 | A1 | * | 3/2020 | Dorton ..................... A01G 3/02 |
| 2021/0251150 | A1 | * | 8/2021 | Dorton ..................... A01G 3/02 |

\* cited by examiner

CUTTING TOOL

CROSS REFERENCE TO RELATED APPLICATIONS

This patent application claims the benefit of priority based on U.S. Provisional Patent Application No. 63/046,639 filed on Jun. 30, 2020, which is incorporated by reference in its entirety for all purposes.

STATEMENT REGARDING FEDERALLY SPONSORED RESEARCH OR DEVELOPMENT

Not Applicable

INCORPORATION-BY-REFERENCE OF MATERIAL SUBMITTED ON COMPACT DISC

Not Applicable

BACKGROUND OF THE INVENTION

1. Field of the Invention

The present invention relates generally to a cutting tool and, more particularly, to a cutting tool for precisely slicing plant stems and tree branches such that the sliced plant stems or branches may be used to start new plant or tree growth after replanting in the ground or grafting with existing root stock.

2. Background Art

Cutting the stems and branches from existing healthy plants and trees and either replanting the stem or branch in a pot of soil or the ground soil or grafting or joining those stems and branches to a healthy root stock of thriving plants and trees is a well-known practice in the world of horticulture and agriculture. The grafting of the stem or branch from one plant species to the root stock of another species of plant or tree is the reason for the number of different species of vegetables, fruits, flowers and the like that have been created by horticulturalist and agriculturist. The science of growing plants or trees from a stem or branch begins with the precision angled cutting of the stem and root stock that enables an adequate supply of water and nutrients from the soil in the pot or ground or root stock to reach the new stem or branch to sustain life in the new stem or branch.

Precision angled cutting of the stem or branch to be planted or grafted ensures an adequate surface area of the newly cut or sliced stem or branch will be provided for planting or grafting. Often, stems or branches are cut normal or perpendicular to the surface of the stem or branch. Cutting or slicing a stem or branch perpendicular to the surface of the stem or branch will provide for the least amount of surface area for the transfer of water and nutrients to the new stem or branch. Providing an adequate surface area is key to ensuring the newly created plant will grow in the pot of soil, ground soil or onto an existing plant or tree. A larger surface area enables more of the cells of the plant to receive water and nutrients from the ground or root stock. Ensuring adequate water and nutrients reach the newly planted or grafted stem or branch will help the plant to grow and ensure survival of the new plant or tree.

There are several prior art cutting tools used for cutting plant stems such that the stems may be used for grafting with root stock. U.S. Pat. No. 9,179,604 issued to Adams is a prior art cutting tool for cutting the stems, branches and root stock of plants and trees used in the grafting the stems, branches and root stocks. Adams requires the user to insert an end portion of a stem vertically into the tool against a guide. A blade is attached to a handle and is proximate the guide. With the stem positioned against the guide, the handle is pulled downward such that the blade encounters the stem and slices a portion of the stem from an end of the stem. Adams states that the positioning of the guide at an angle relative to the blade enables the blade to remove a portion of the stem that creates an angle cut at the bottom of the stem.

There are several disadvantages with the prior art cutting tool of Adams. First, the user must insert the bottom portion of the stem at the guide in a vertical fashion. It is difficult for a user of the tool to see if the portion of the plant stem positioned in the tool has been inserted to a sufficient depth to create an angle with sufficient surface area in the stem during the cutting process to ensure a successful planting or grafting. If the angle created in the stem is not of a sufficient angle, planting in the pot of soil, ground soil or grafting to a root stock may fail because there is not an adequate amount of plant cells available between the grafted stem and root stock to ensure the necessary transfer of water and nutrients from the root stock to the newly grafted stem to sustain the life of the stem. Second, because it is difficult to see the position of the stem in the cutting tool, the user cannot ensure a consistent angled cutting or slicing of the stem to create the surface area sufficient in the stem to ensure proper planting or grafting.

Third, the size and design of the prior art cutting tool is of a size and design that are not conducive to hand held cutting and, therefore, results in added time to process a number of stems and to ensure a consistent cut or slice that ensure adequate surface area in the stem for planting or grafting. The prior art cutting tool is designed to rest on a surface such as a bench or level ground to provide leverage for the user to actuate the handle. The prior art cutting tool cannot be actuated while being held in the hand, thereby leading to added time to cut or slice a stem or branch. Further, each stem or branch that is cut will lack a consistent cut or slice angle.

Others practicing the art of slicing or cutting stems may simply use an open-ended knife such as a scalpel and slice the stem against a finger of their opposite hand. While this method may seem to be quicker to produce sliced stems with an adequate angle for planting, it is certainly not safe. Often, users will inadvertently slice into their fingers with the knife opening a wound that may require the care of a doctor to close. This may lead to lost time for processing stems if the user is unable to continuing slicing stems due to the injury. Furthermore, there is no guide available for the users of an open-ended knife to ensure a consistent, angled slice in the stem.

Therefore, a need exists for a cutting tool that will ensure a large number of stems or branches can be cut or sliced with a consistent, adequate surface area to enable the supply of water and nutrients from the pot of soil or ground soil to pass directly to the stem or branch or through root stock to ensure that the newly planted or grafted stem or branch will survive and thrive to create a new plant of tree. Further, a need exists for a safe cutting tool that will enable the user to ensure one does not injure themselves by cutting into a body part such as a finger. Still further, a need exists for a hand-held cutting tool that is easy to use and can be operated quickly to cut or slice the large number of stems or branches safely, quickly and with a consistent angled surface area.

BRIEF SUMMARY OF THE INVENTION

A cutting tool is provided. The cutting tool is comprised of a body, the body including a first wall, a second wall, a third wall, and a base, each of the first wall, the second wall and the third wall extending outward from the base, the first wall, the second wall, the third wall and the base together define a trough in the body, a blade holder in the trough, the blade holder including a first side pivotally engaged to the first wall and a second side pivotally engaged to the second wall, a strut assembly in the trough, the strut assembly including a spring, the strut assembly is pivotally engaged with the first and second side walls of the blade holder and pivotally engaged with the first and second side walls of the body, a blade in the blade holder, a blade channel in the body and extending through the third wall so as to receive the blade, at least one angled body channel in the body and wherein the blade holder is pivotable relative to the body to enable the blade to cut through a plant stem or tree branch present in the blade channel and the at least one angled body channel.

BRIEF DESCRIPTION OF THE SEVERAL VIEWS OF THE DRAWINGS

The features and inventive aspects of the present invention will become more apparent from the following detailed description, claims, and drawings, of which the following is a brief description:

DETAILED DESCRIPTION OF THE INVENTION

Figure 1:
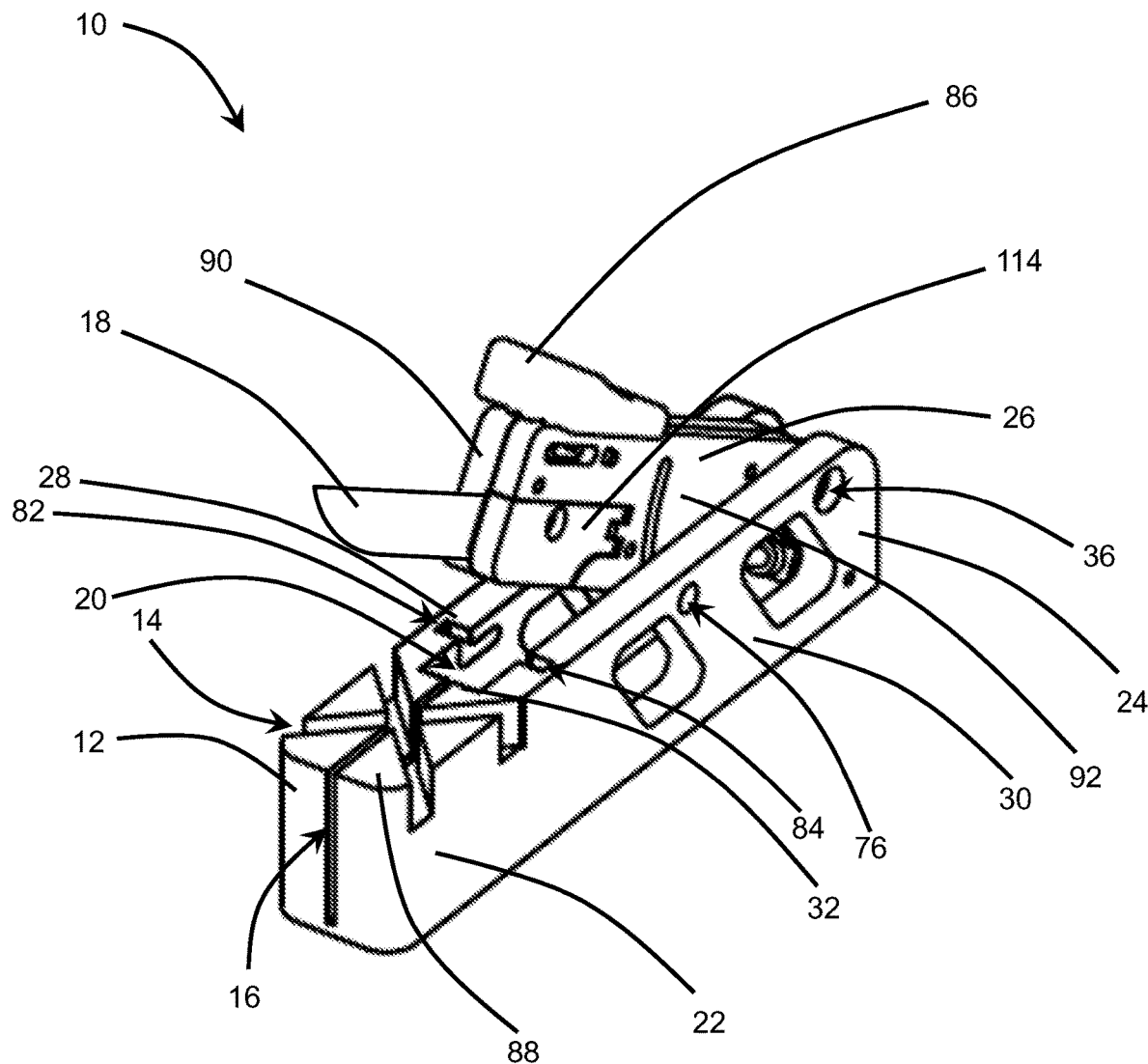
FIG. 1 is a front perspective of a cutting tool according to an embodiment of the present invention.
Figure 2:
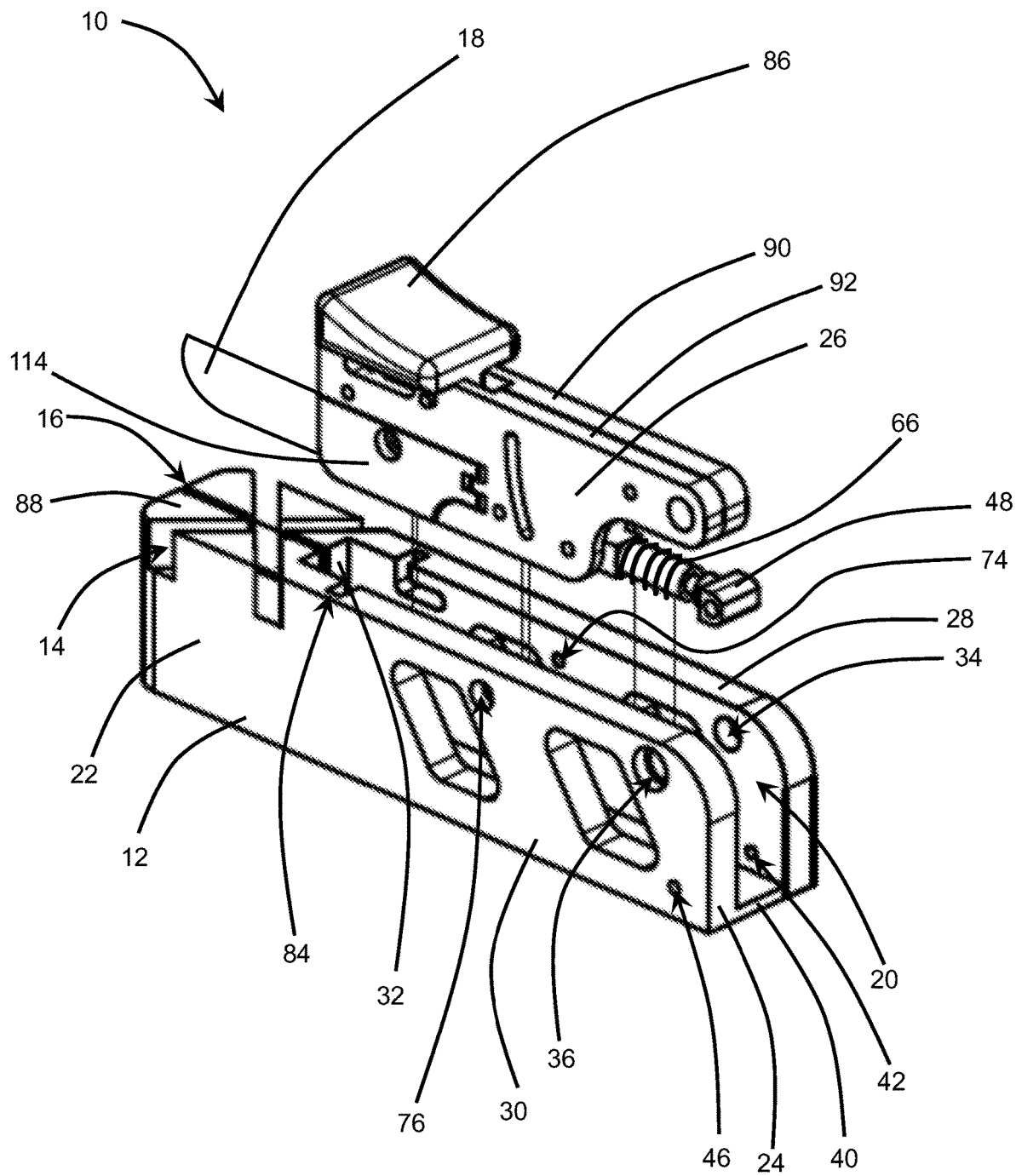
FIG. 2 is a rear perspective view of a body and a blade holder of the cutting tool according to the embodiment of the present invention.

Referring now to the drawings, preferred illustrative embodiments of the present invention are shown in detail. Although the drawings represent embodiments of the present invention, the drawings are not necessarily to scale and certain features may be exaggerated to better illustrate and explain the present invention. Further, the embodiments set forth herein are not intended to be exhaustive or otherwise to limit or restrict the invention to the precise forms and configurations shown in the drawings and disclosed in the following detailed description.

An agricultural cutting tool 10 is illustrated in FIG. 1. Cutting tool 10 may be used to cut the stem of a plant or branch of a tree at a sufficient angle to support successful transplanting of a cut stem or cut branch to create a new plant or tree. Cutting tool 10 may also be used to enable the successful grafting of a stem or branch from a first plant or first tree to a second plant or second tree. Transplanting stems or branches from an existing plant or tree and grafting stems or branches from a first plant or first tree to a second plant or second tree are well known methods in the agricultural world. These planting techniques ensure the growth of new plants and trees can be started quickly, versus having to start plants from seeds each time. Grafting helps agriculturalist to develop hybrids plants and trees to provide a broader variety of flowers, vegetables, fruits, nuts and the like. Cutting tool 10 facilitates a quick, safe, and repeatable cutting or trimming of plant stems and tree branches to support the agricultural methods above.

Figure 13:
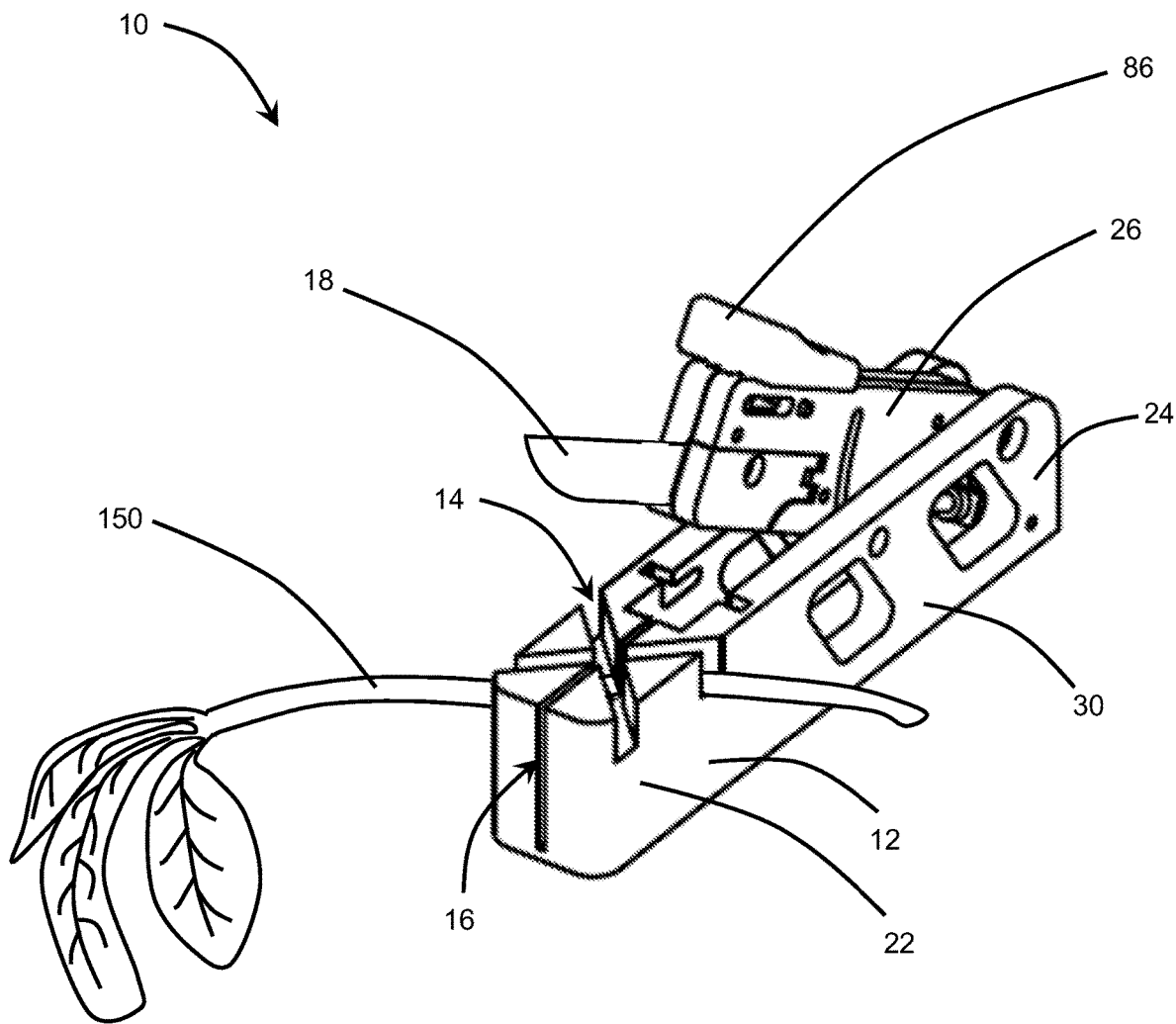
FIG. 13 is a front perspective of the cutting tool shown with a plan stem in position for cutting according to an embodiment of the present invention.

Cutting tool 10 includes a body 12. Body 12 includes at least one angled body channel 14 that may be sized to capture and position a plant stem or tree branch. Body channel 14 is positioned at a front portion 22 of body 12. Body 12 further includes a blade channel 16 that is sized to allow a blade 18 to freely enter and exit blade channel 16. Blade 18 may be any type of cutting-edge blade including but not limited to a knife blade, razor blade, scalpel blade and the like. Blade channel 16 intersects body channel 14 at any angle such as, for example, 30°, 45°, 60°, 110° and others, and enables blade 18 to pass though body channel 14 as blade 18 enters and exits blade channel 16. Blade 18 may be used to cut or slice through the plant stem or tree branch positioned in angled body channel 14 (see FIG. 13).

Body 12 also includes a first wall 28, a second wall 30 and a third wall 32 that extend generally upward from a base 40. Walls 28, 30 extend from a rear portion 24 of body 12 and intersect third wall 32 at front portion 22. Walls 28, 30, 32 cooperatively create a trough 20. Trough 20 extends from rear portion 24 of body 12 to front portion 22. Trough 20 is open at rear portion 24. Trough 20 is sized to position and accept a blade holder 26.

Now referring to FIGS. 1, 2, 9A, 9B and 11, body 12 includes a first blade holder pivot point hole 34 positioned near a top of wall 28 and near rear portion 24. First hole 34 extends through wall 28 from an outside of body 12 into trough 20. A second blade holder pivot point hole 36 is positioned near a top of wall 30 and near rear portion 24 of body 12. Second hole 36 extends through wall 30 from an outside of body 12 into trough 20. First hole 34 is aligned with second hole 36 and both holes 34, 36 are sized to accept a first pin or screw 38. Holes 34, 36 and pin 38 are configured to cooperatively secure blade holder 26 to body 12. Pin 38 provides a pivot point for blade holder 26 relative to body 12 and enables blade holder 26 to move freely into and out of trough 20.

Body 12 includes a first lower strut assembly mounting point hole 42 positioned near base 40 and near rear portion 24. First hole 42 extends through wall 28 from an outside of body 12 into trough 20. A second lower strut assembly mounting point hole 44 is positioned near base 40 and near rear portion 24 of body 12. Second hole 44 extends through wall 30 from an outside of body 12 into trough 20. First hole 42 is aligned with second hole 44 and both holes 42, 44 are sized to accept a second pin or screw 46. Holes 42, 44 and pin 46 are configured to cooperatively secure a strut assembly 48 to body 12.

Figure 3:
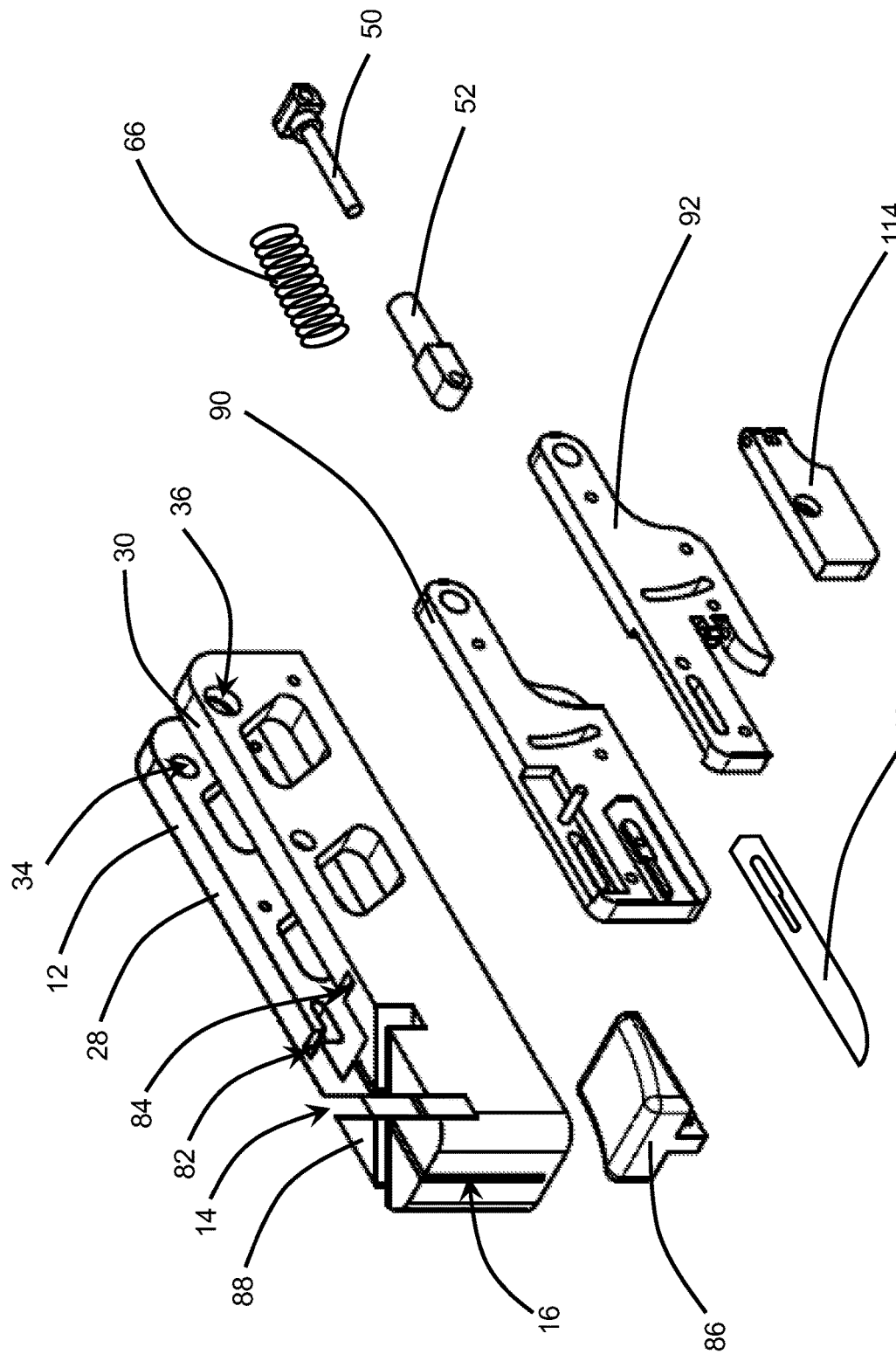
FIG. 3 is an exploded view of the body and the blade holder of the cutting tool according to the embodiment of the present invention.
Figure 4:
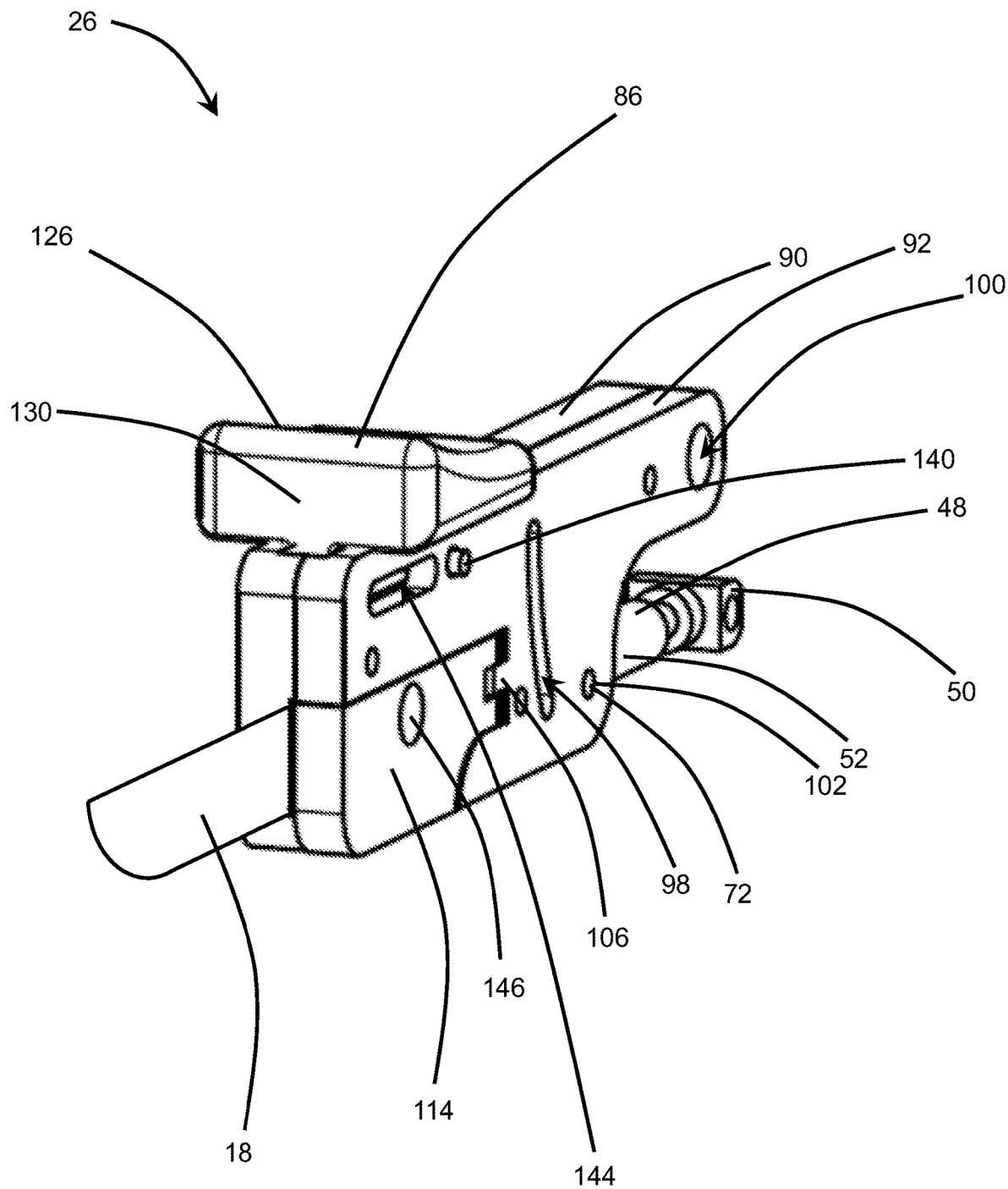
FIG. 4 is perspective view of the blade holder of the cutting tool according to the embodiment of the present invention.
Figure 5:
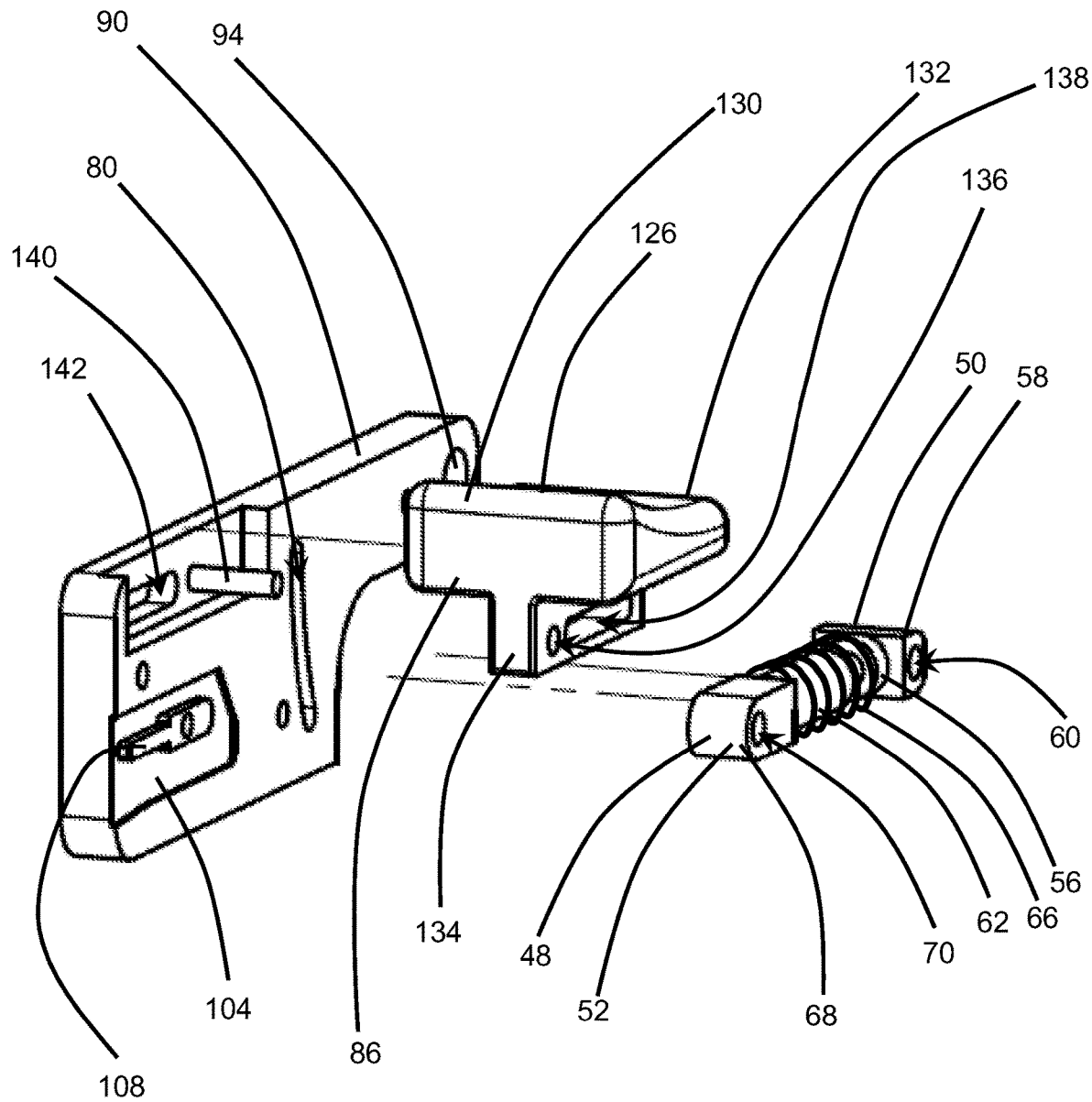
FIG. 5 is an exploded view of a first side, a thumb lock and a strut assembly of the blade holder according to the embodiment of the present invention.
Figure 6:
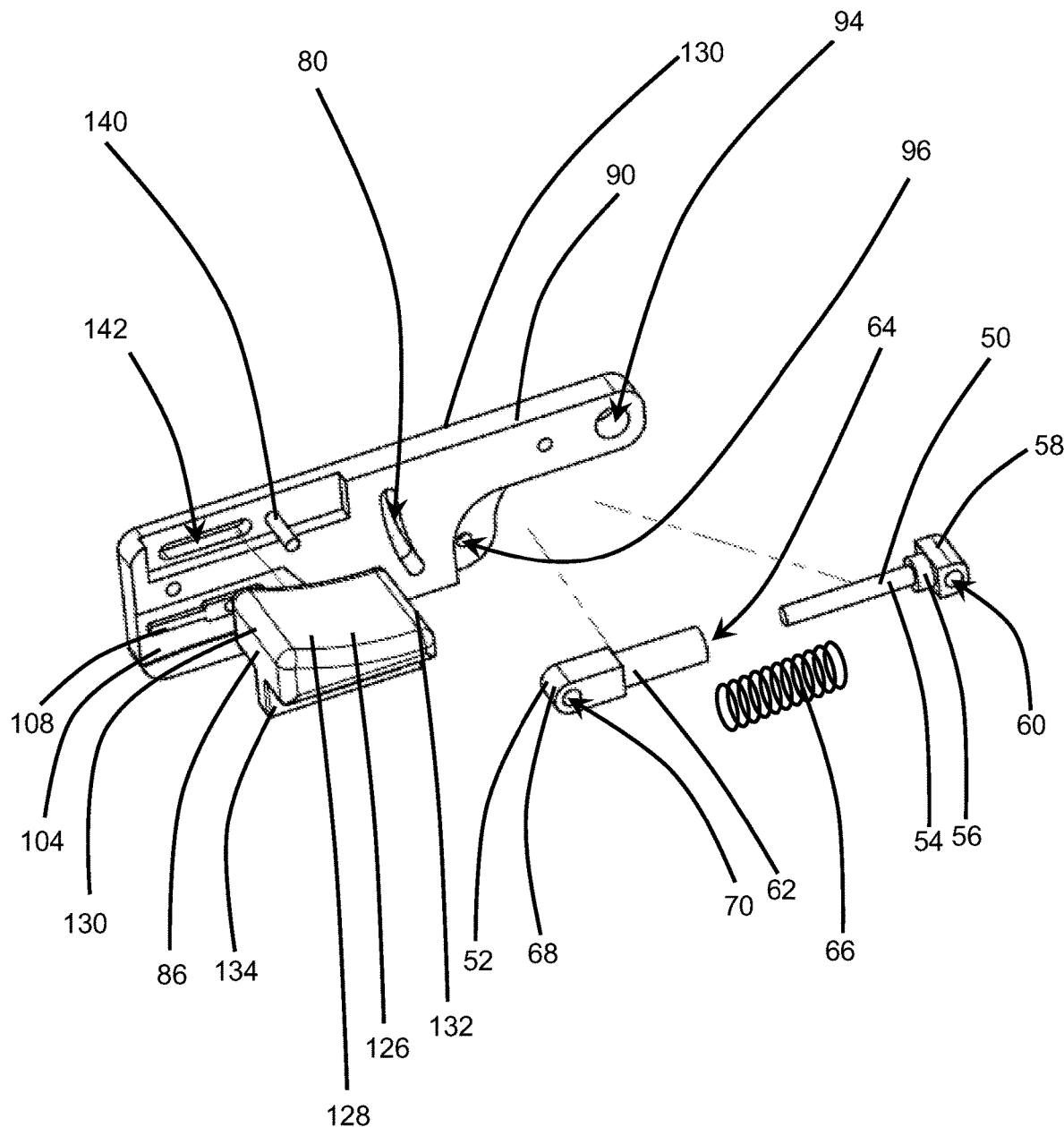
FIG. 6 is another exploded view of the first side, the thumb lock and the strut assembly of the blade holder according to the embodiment of the present invention.
Figure 7:
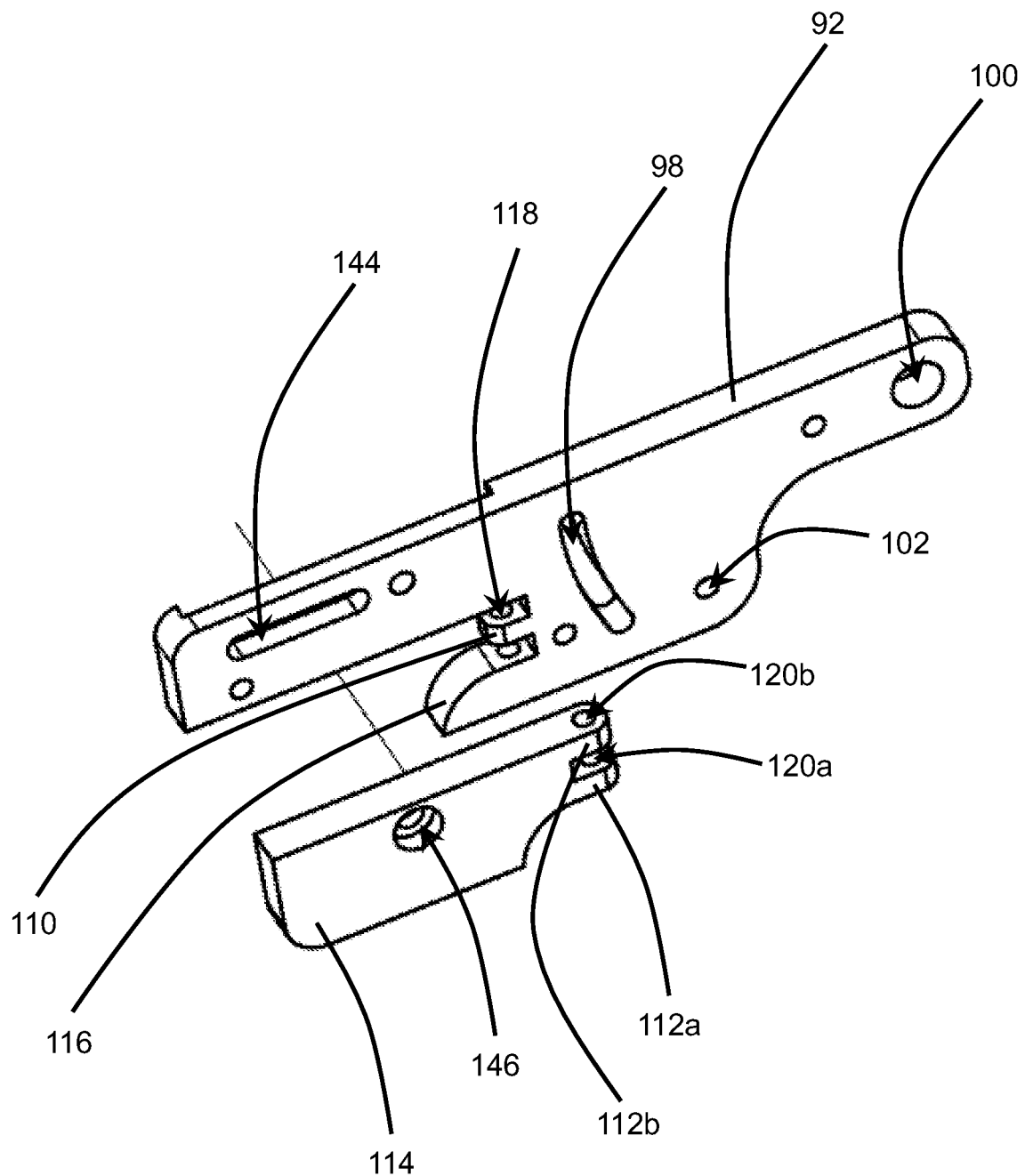
FIG. 7 is an exploded view of a second side and a blade cover of the blade holder according to the embodiment of the present invention.
Figure 8:
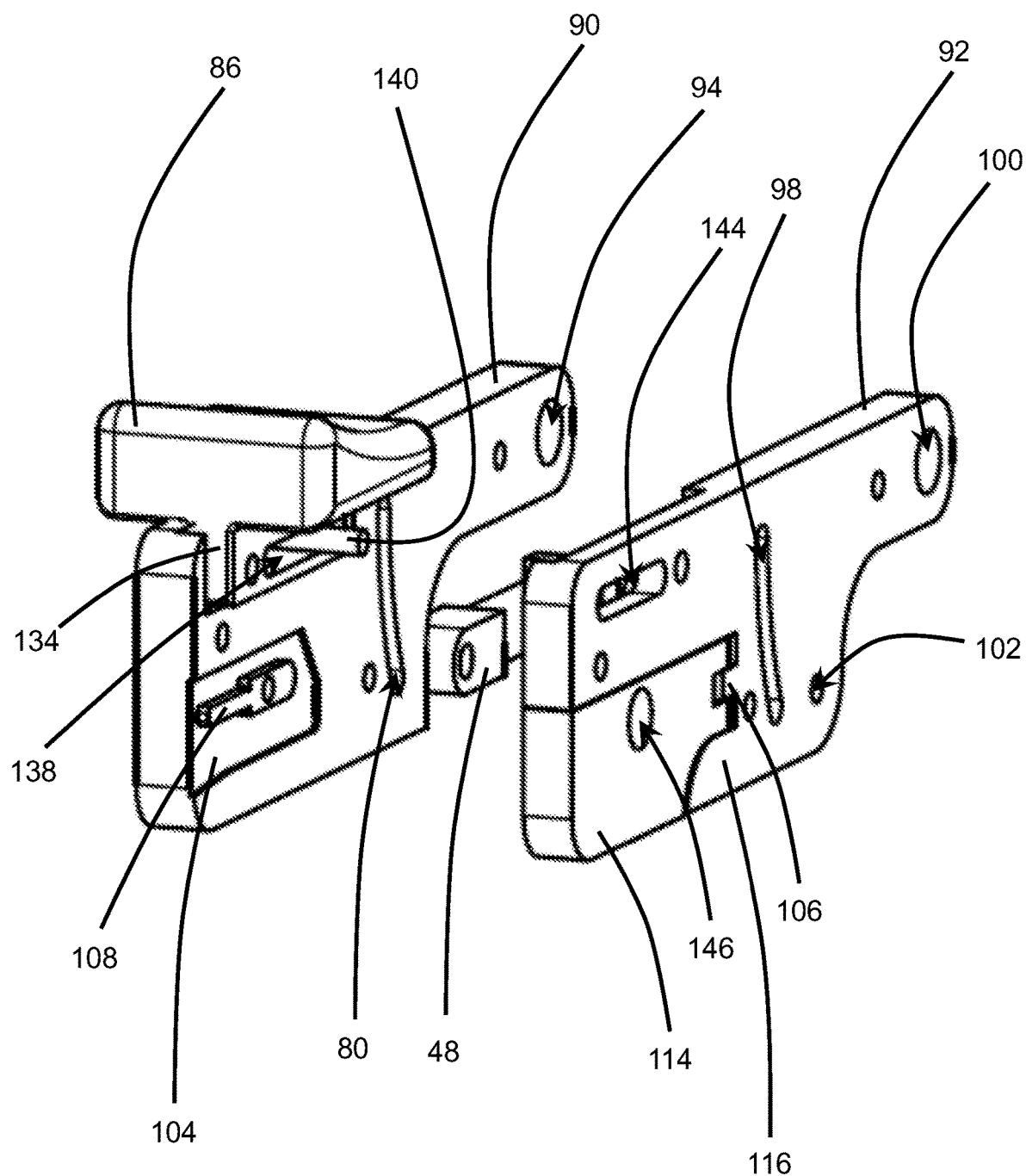
FIG. 8 is a perspective view of the first side, the second side, the thumb lock and the strut assembly of the blade holder according to an embodiment of the present invention.
Figure 9A:
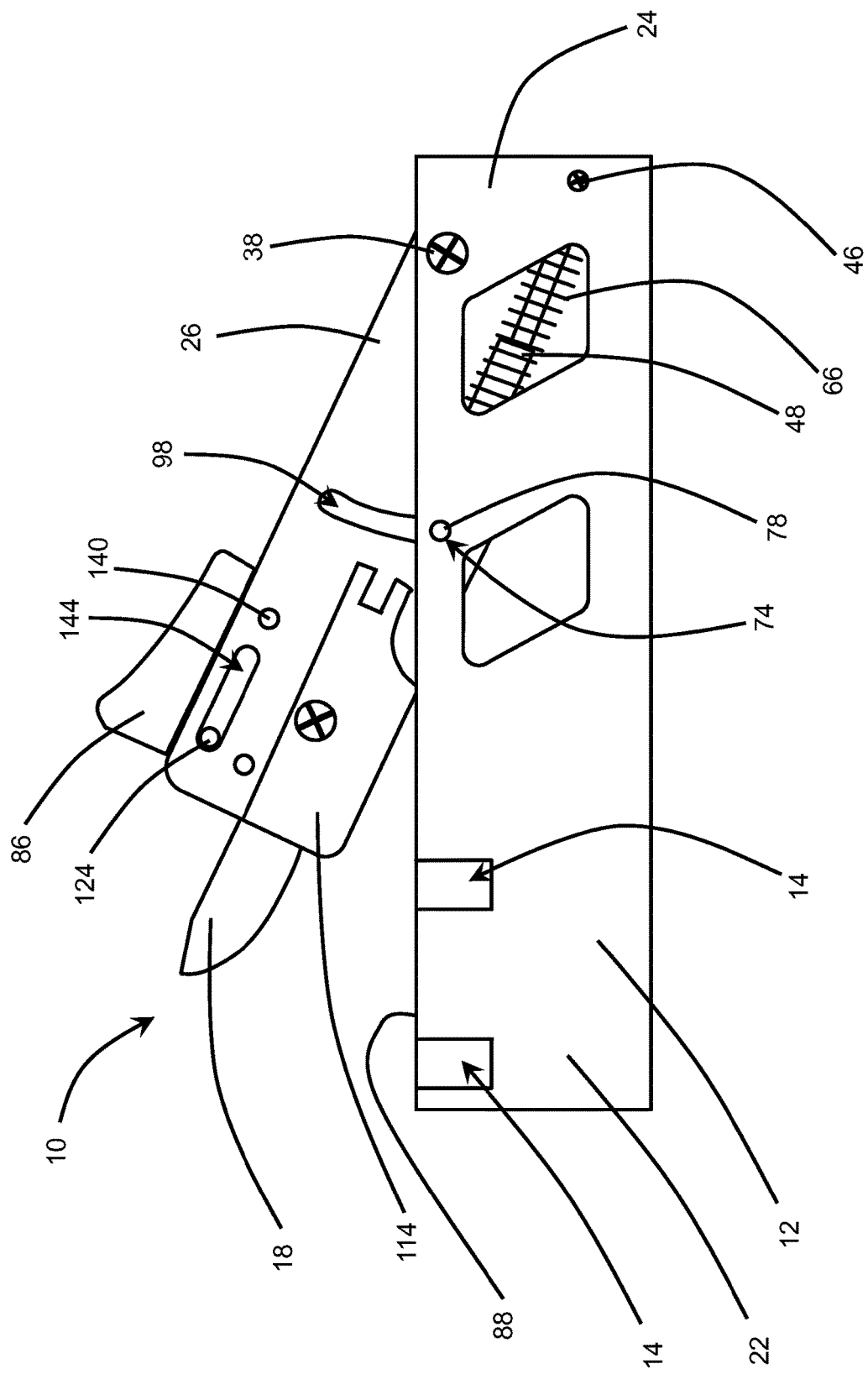
FIG. 9A is a side view of the cutting tool shown in an open position according to an embodiment of the present invention.
Figure 9B:
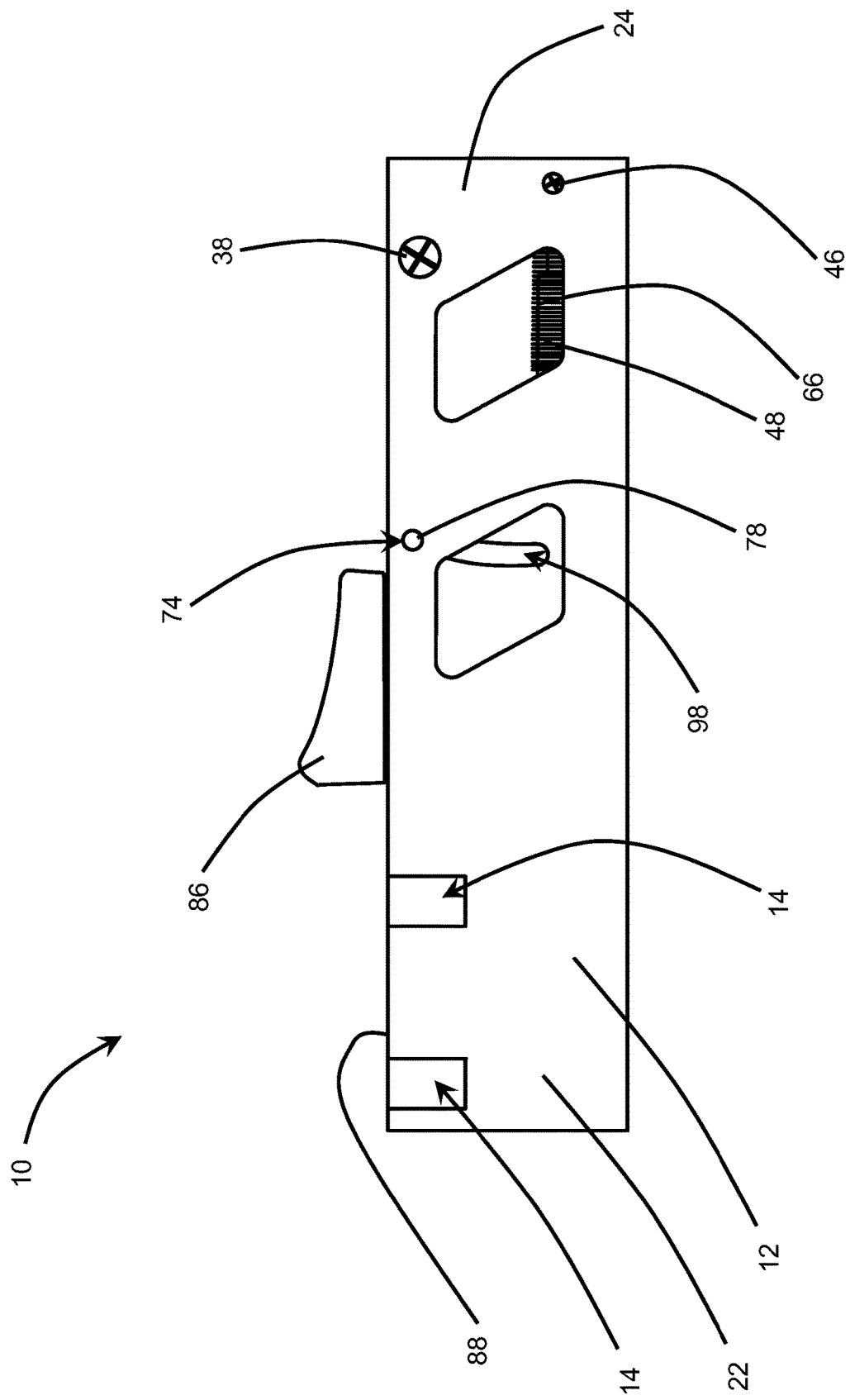
FIG. 9B is a side view of the cutting tool shown in a closed position according to an embodiment of the present invention.
Figure 10A:
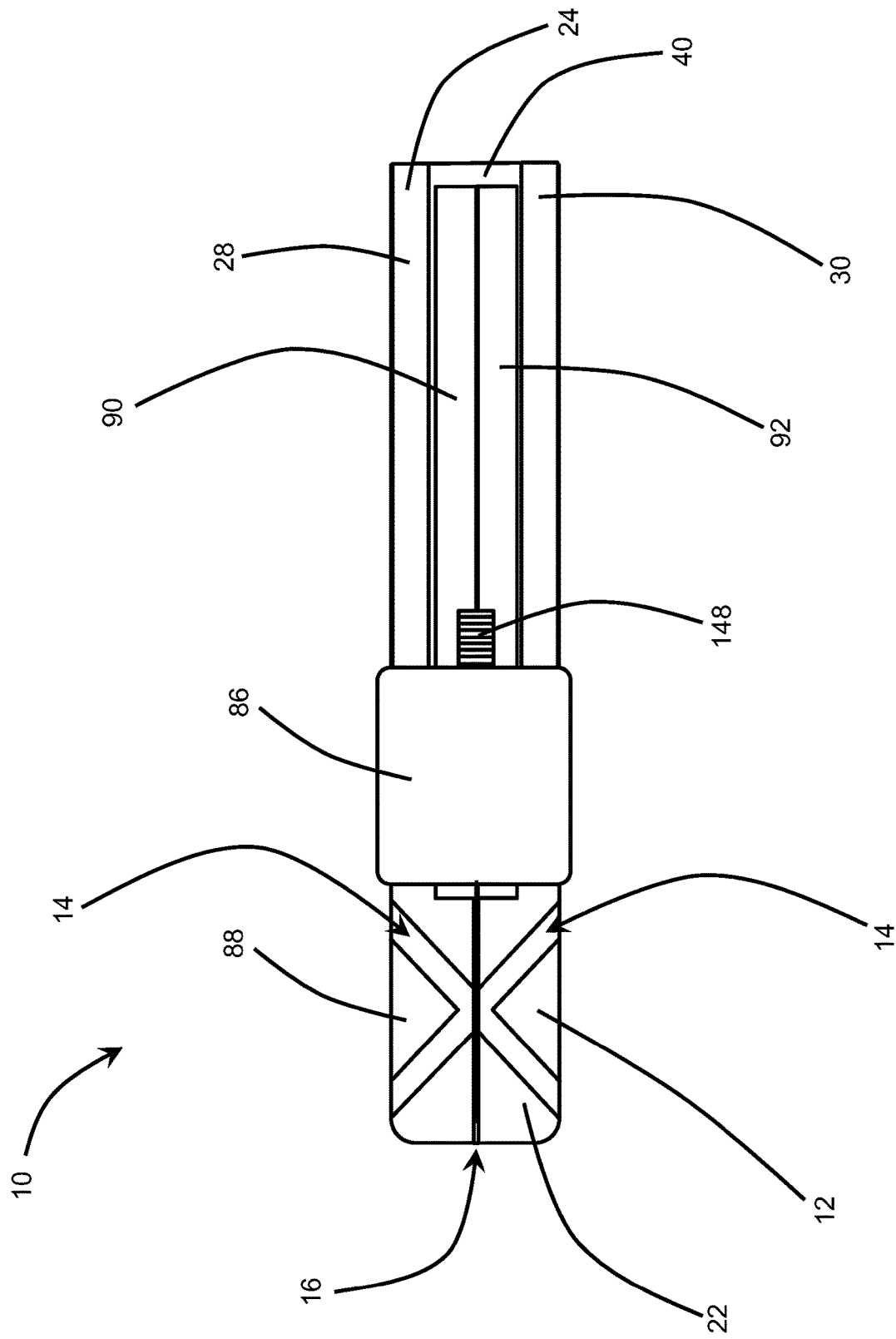
FIG. 10A is a top view of the cutting tool shown in an open position according to an embodiment of the present invention.
Figure 10B:
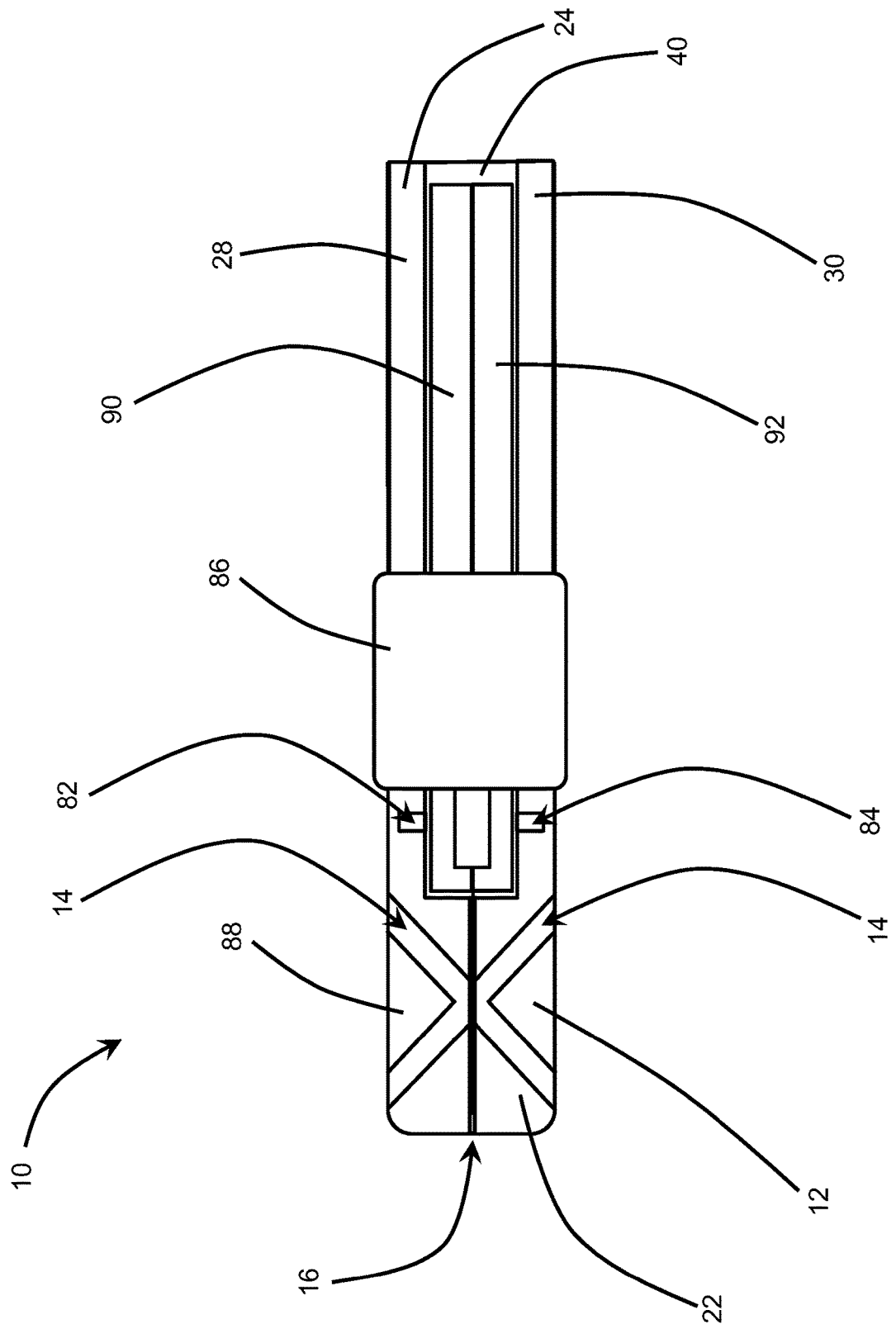
FIG. 10B is a top view of the cutting tool shown in a closed position according to an embodiment of the present invention.
Figure 11:
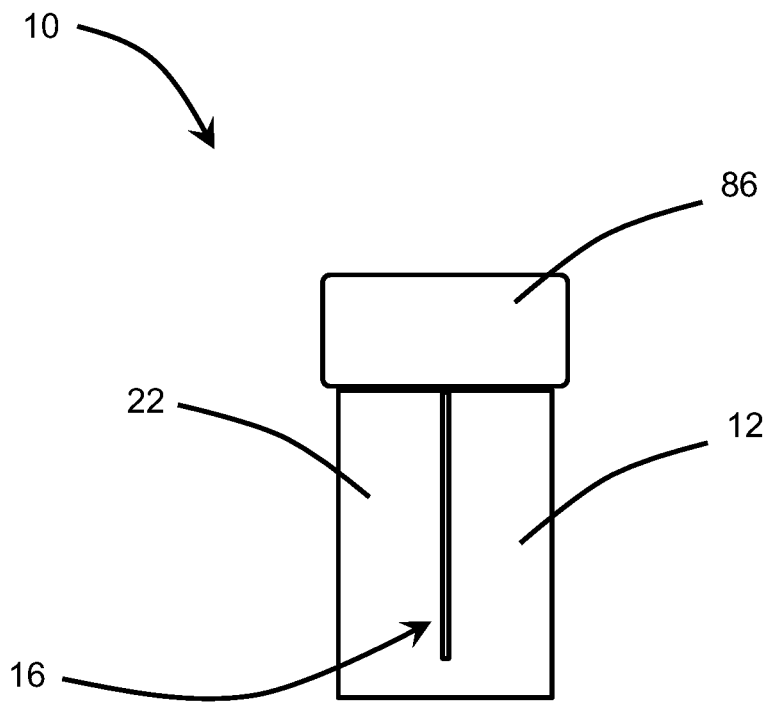
FIG. 11 is a front view of the cutting tool shown in a closed position according to an embodiment of the present invention.
Figure 12:
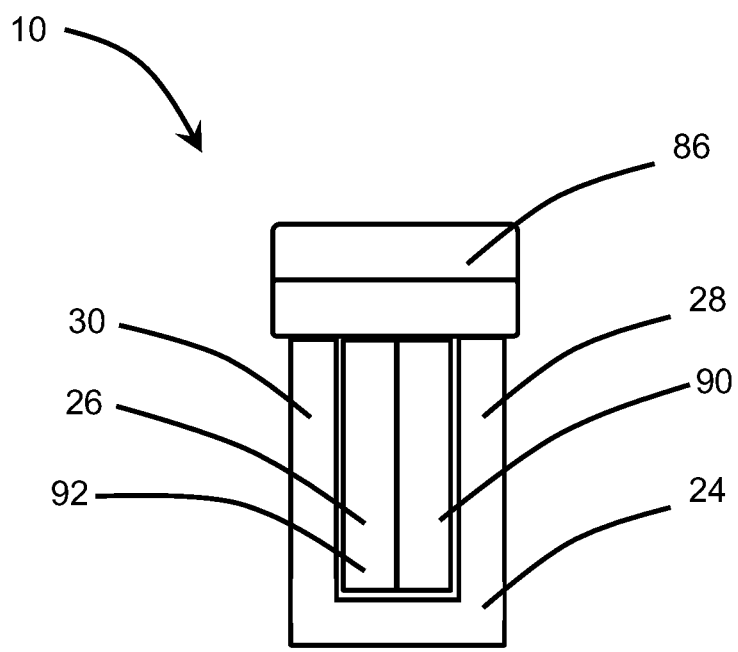
FIG. 12 is a rear view of the cutting tool shown in a closed position according to an embodiment of the present invention.

Strut assembly 48 includes a lower strut 50, an upper strut 52 and a spring 66 as illustrated in FIGS. 3, 5, and 6. Lower strut 50 includes a strut shaft 54, a spring stop 56 and a lower mount 58. Lower mount 58 includes a hole 60 that extends a width of lower mount 58 and is sized to accept second pin 46 to secure lower strut 50 and strut assembly 48 to body 12. Upper strut 52 includes a spring guide 62 and an upper mount 68. Spring guide 62 includes a shaft guide hole 64 extending a length of spring guide 62. An inner diameter of shaft guide hole 64 is sized to accept strut shaft 54. Upper mount 68 includes a hole 70 that extends a width of upper mount 68 and is sized to accept a third pin 72 to secure upper strut 52 and strut assembly 48 to blade holder 26. Pin 72 provides a pivot point for strut assembly 48 relative to blade holder 26 and enables blade holder 26 to move freely into and out of trough 20.

Spring 66 has an inner diameter larger than the outer diameter of spring guide 62 and strut shaft 54 to allow spring to move freely over spring guide 62 and shaft 54. A first end of spring 66 engages spring stop 56 at lower mount 58 and an opposite end of spring 66 engages a surface of upper mount 68 such that spring is captured on strut assembly 48 between spring stop 56 and upper mount 68. Spring 66 is compressed between spring stop 56 and upper mount 68 as a portion of shaft 54 enters shaft guide hole 64 and spring stop 56 moves toward upper mount 68. Spring 66 expands between spring stop 56 and upper mount 68 as a portion of shaft 54 moves out of shaft guide hole 64 and spring stop 56 moves away from upper mount 68. Spring 66 will work to stay in the expanded phase as opposed to being compressed. Furthermore, spring 66, lower strut 50 and upper strut 52 are configured to enable blade holder 26 to remain in a normally open position.

Body 12 includes a first blade travel stop hole 74 positioned near the top of wall 28 approximately midway between front portion 22 and rear portion 24. First hole 74 extends through wall 28 from an outside of body 12 into trough 20. A second blade travel stop hole 76 is positioned at the top of wall 30 approximately midway between front portion 22 and rear portion 24 of body 12. Second hole 76 extends through wall 30 from an outside of body 12 into trough 20. First hole 74 is aligned with second hole 76 and both holes 74, 76 are sized to accept a fourth pin 78 (see FIGS. 9A and 9B). Holes 74, 76 and pin 78 are configured to cooperatively engage slots 80, 98 of blade holder 26 to limit the travel of blade holder 26 into and out of trough 20.

Wall 28 includes a first thumb lock slot 82 that is open at a top surface of wall 28 near front portion 22 of body 12 as illustrated in FIGS. 1-3 and 10B. First thumb lock slot 82 extends downward from the top surface of wall 28 on the trough side of wall 28 a short distance and slot 82 bends at a generally right angle such the slot 82 is now generally parallel to base 40. First thumb lock slot 82 extends rearward toward rear portion 24. Wall 30 includes a second thumb lock slot 84 that is open at a top surface of wall 30 near front portion 22 of body 12. Second thumb lock slot 84 extends downward from the top surface of wall 30 on the trough side of wall 30 a short distance and slot 84 bends at a right angle such the slot 84 is now generally parallel to base 40. Second thumb lock slot 84 extends rearward toward rear portion 24. Slots 82, 84 are mirror opposites of one another in walls 28, 30 respectively and are configured to cooperatively capture a thumb lock retaining pin 124 of a thumb lock 86 of blade holder 26 to secure blade holder 26 when blade holder 26 is positioned in trough 20 and blade holder 26 is in a closed position relative to body 12.

Angled body channel 14 extends through a top surface 88 of front portion 22 as shown in FIGS. 1-3, 10A and 10B. Body channel 14 extends from a first side of front portion 22 to a second side of front portion 22 such that an angle is created at blade channel 16. The angle created between angled body channel 14 and blade channel 16 is configured to create a cut angle in the stem or branch that will ensure an adequate surface area in the new stem or branch for optimal growth of a new plant or tree when the freshly cut stem or branch is planted in soil. It is important to note top surface 88 may include multiple channels at varying angles relative to blade channel 16 to provide varying cutting angles in cut stems and branches to ensure the optimal surface area for enabling growth of a new plant or tree.

In this particular embodiment of the present invention, blade holder 26 may be comprised of a first blade holder side 90 and a second blade holder side 92 as illustrated in FIGS. 3-8 and 12. First side 90 includes a first pivot point hole 94, a first upper strut mount hole 96 and first travel stop pin slot 80. Second side 92 includes a second pivot point hole 100, a second upper strut mount hole 102 and second travel stop pin slot 98. When first side 90 and second side 92 are mated together to form blade holder 26, holes 94, 100, holes 96, 102 and slots 80, 98 are generally in alignment. Holes 94, 100 are configured to align with first blade holder pivot point hole 34 of wall 28 and second blade holder pivot point hole 36 of wall 30 such that pin 38 may be positioned and secured into holes 34, 94, 100, 36 to secure blade holder 26 to body 12. The inner diameter of holes 34, 94, 100, 36 is larger than the outer diameter of pin 38 to allow blade holder 26 to move and pivot relative to body 12.

Upper strut mount holes 96, 102 are configured to align with hole 70 of upper mount 68 such that third pin 72 may be positioned and secured into holes 70, 96, 102 to secure strut assembly 48 to blade holder 26. The inner diameter of holes 70, 96, 102 is larger than the outer diameter of pin 72 to allow blade holder to move and pivot relative to strut assembly 48.

As stated above, slots 80, 98 are configured to align with first blade travel stop hole 74 of wall 28 and second blade travel stop hole 76 of wall 30 such that pin fourth 78 may be positioned and secured in holes 74, 76 while pin 78 is allowed to move freely within slots 80, 98. Slots 80, 98 are generally curved and include a stop at either end of slots 80, 98 to allow blade holder 26 a range of motion into and out of trough 20. The stops help to limit the range of travel for blade holder 26 as it moves into and out of trough 20.

First side 90 of blade holder 26 further includes a recess 104 for positioning a blade 18 on blade holder 26. Recess 104 may be of any shape to position a first end of blade to blade holder 26. Recess 104 includes an elongated alignment extrusion 108 that will correspond to a slot in blade 18 to further align the position of blade 18 relative to blade holder 26. A second end of blade 18 will extend outward from blade holder 26 and be of a thickness less than the width of blade channel 16 to allow blade 18 to enter and exit blade channel 16 as blade holder 26 is moved into and out of trough 20. Blade 18 will be of sufficient sharpness to slice cleanly through any stem or branch positioned in blade channel 16 through channel 14.

Second side 92 of blade holder 26 further includes a blade holder pivot tab 110 that extends outward from a recess near slot 98. Second side 92 of blade holder 26 also includes a finger 116 that extends outward and in the same plane as blade holder 26 from a bottom portion of second side 92 just below tab 110. A vertical hole 118 extends through finger 116, tab 110 and into a main portion of second side 92. Tab 110 is sized and configured to engage a lower prong 112a and an upper prong 112b of a blade cover 114. Lower prong 112a includes a hole 120a and upper prong 112b includes a hole 120b. Blade cover 114 may be assembled to second side 92 by aligning tab 110 in between lower prong 112a and upper prong 112b and aligning holes 118 of tab 110 and finger 116 and holes 120a, 120b of prongs 112a, 112b. With holes 118, 120a, 120b aligned, a pin 122 may be introduced in holes 118, 120a, 120b to create a hinge 106 and secure blade cover 114 to second side 92. Hinge 106 created by tab 110, prongs 112a, 112b, holes 118, 120a, 120b and pin 122 allows for blade cover 114 to be rotated about the hinge relative to second side 92 of blade holder 26.

As stated above, cutting tool 10 includes thumb lock 86 and includes thumb lock retaining pin 124. Thumb lock 86 includes a top 126 having a generally trapezoidal shape with a top surface 128 that is generally curved convex from a front edge 130 to a rear edge 132. Top 126 is sized to allow a typical human thumb to comfortably rest on thumb lock 86. Thumb lock 86 also includes a stem 134. Stem 134 includes a hole 136 configured to accept pin 124 and secure pin 124 to thumb lock 86. Pin 124 is configured to slide freely within a first thumb lock slide slot 142 of first side 90 and a second thumb lock side slot 144 of second side 92. Pin 124 is also configured to slide freely within a first thumb lock slot 82 of first wall 28 and second thumb lock slide slot 84 of second wall 30 and enable thumb lock 86 to slide fore, aft, upward and downward about slots 82, 84 thereby locking blade holder 26 in a closed position relative to body 12 when pin 124 is secured in slots 82, 84. Stem further includes a thumb lock glide slot 138. Slot 138 is configured to engage a thumb lock retaining pin 140 that extends between first side 90 and second side 92 of blade holder 26 to secure thumb lock 86 to blade holder 26 while allowing thumb lock 86 to slide fore and aft about slot 138. A spring 148 is also included at the rear of thumb lock 86 and illustrated in FIG. 10A. Spring 148 engages stem 134 and biases thumb lock 86 in an open position such that thumb lock 86 will not slide rearward each time cutting tool 10 is actuated.

According to an embodiment of the present invention, cutting tool 10 may be assembled in the following manner. Stem 134 of thumb lock 86 may be aligned on an inner face of first side 90 of blade holder 26 such that pin 124 is resting in slot 142 and thumb lock retaining pin 140 is resting in slot 138 of thumb lock 86. Hole 70 of upper mount 68 of strut assembly 48 may engage third pin 72 extending from first upper strut mount holes 96. With thumb lock 86 and strut assembly 48 position on the inner face of first side 90, an inner face of second side 92 may be mated to the inner face of first side 90 to secure thumb lock 86 and strut assembly 48 to blade holder 26. First side 90 and second side 92 may be secured together by fasteners such as screws and nuts and bolts, glue and the like.

Blade holder 26 may be assembled to body 12 by introducing blade holder 26 into trough 20 such that first pivot point hole 94 of first side 90 and second pivot point hole 100 of second side 92 are aligned with first blade holder pivot point hole 34 of first wall 28 and second blade holder pivot point hole 36 of second wall 28. With holes 94, 100, 34, 36 now in alignment, first pin 38 may be press fit into holes 94, 100, 34, 36 to secure blade holder 26 to body 12. Pin 38 will also enable blade holder 26 to rotate about body 12 such that a portion of blade holder 26 may freely enter and exit trough 20.

Further, strut assembly 48 and spring 66 may be secured to body 12 as described above. First lower strut assembly mounting point hole 42 of wall 28 and second lower strut assembly mounting point hole 44 of wall 30 may be aligned with hole 60 of lower mount 58 of mount assembly 48. Second pin 46 may be press fit in holes 42, 44, 60 to secure strut assembly 48 to body 12 and to secure blade holder 26 to body 12 through strut assembly 48 at a second location.

Fourth pin 78 may be press fit into first blade travel stop hole 74 of wall 28 and second blade travel stop hole 76 of wall 30 such that fourth pin 78 passes freely into travel stop pin slots 80, 98 of blade holder 26. Fourth pin 78 may limit the travel of blade holder 26 into and out of trough 20.

Blade 18 may be assembled to cutting tool 10 by placing a first end of blade 18 onto elongated alignment extrusion 108 of recess 104 of first side 90 of blade holder 26. The second end of blade 18 may extend outward past a front face of blade holder 26 such that a sharpened end of blade 18 may be exposed to engage plant stems or tree branches poisoned in blade channel 16. Blade 18 will be of sufficient sharpness to slice cleanly through any stem or branch positioned in blade channel 16 through angled body channel 14. Blade cover 114 may be added to blade holder 26 as described above and secured to blade holder at hinge 106 and a fastener such as a screw may be added at a blade cover screw hole 146 to further secure blade cover 114 to blade holder 26.

Body 12, first side 90 of blade holder 26 and second side 92 of blade holder 26 may be manufactured of any type of material including metals such as steel, polymers such as plastic and the like. Pins and fasteners may also be manufactured of any type material including metals such as steel, polymers such as plastic and the like.

Figure 14:
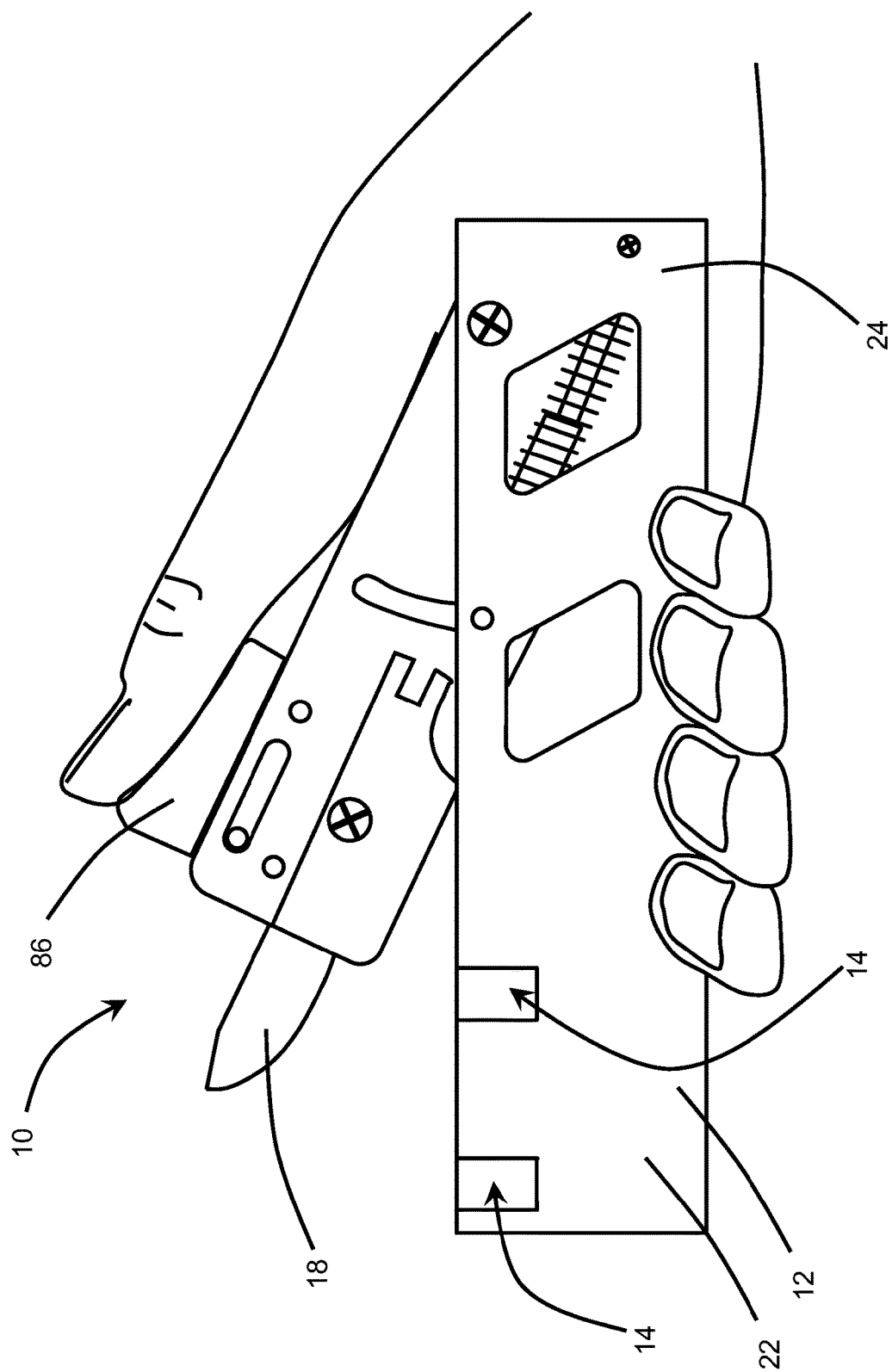
FIG. 14 is a side view of the cutting tool shown in an open position with the cutting tool positioned in a hand according to an embodiment of the present invention.
Figure 15A:
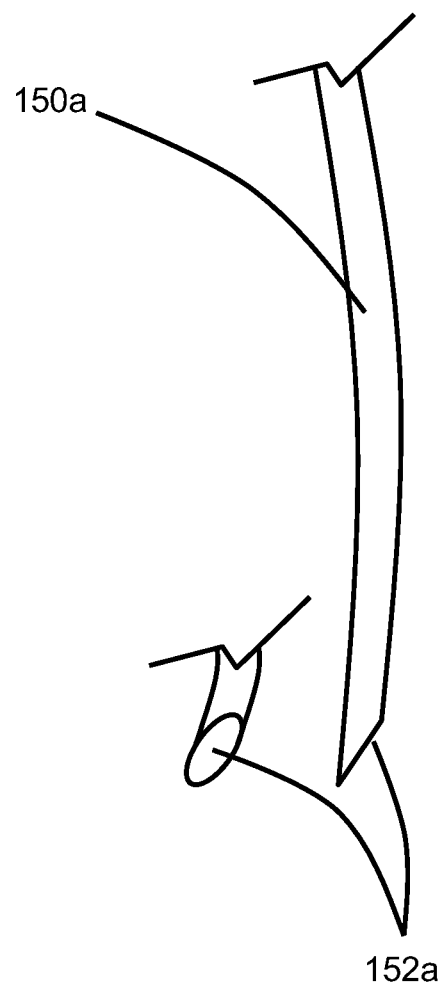
FIG. 15A is a view of a plant stem that has been angle cut by the cutting tool and the resulting surface area of the end of the plant stem.
Figure 15B:
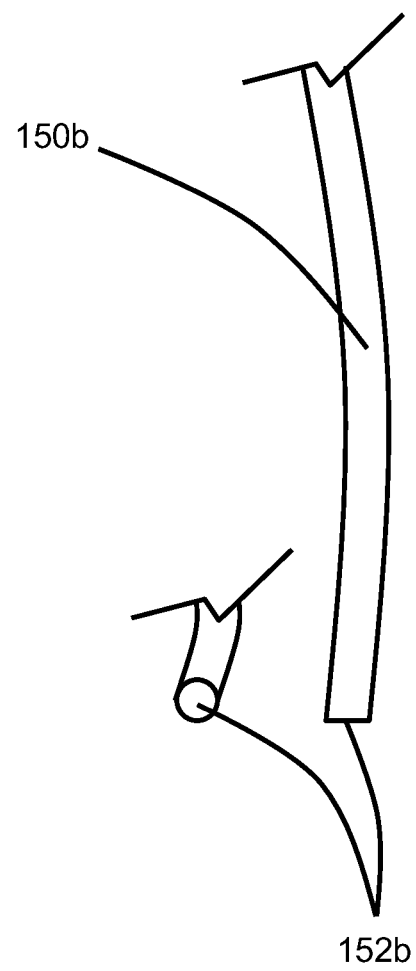
FIG. 15B is a view of a plant stem that has been straight cut by traditional mean and the resulting surface area of the end of the plant stem.

Cutting tool 10 may be actuated in the following manner. With cutting tool 10 in a closed position, blade holder 26 resting in trough 20, a typical human thumb may engage thumb lock 86 at top surface 128 and the remainder of the human hand may grasp cutting tool 10 such that the fingers wrap around an exterior of base 40 to ensure a proper grasp of tool 10 for cutting plant stems and tree branches (see FIG. 14). Thumb lock 86 may be slid forward to enable thumb lock pin 124 to exit thumb lock slots 82, 84. The individual may expand their hand and allow spring 66 and strut assembly 48 to rotate blade holder 26 about first pin 38 out of trough 20 and into an open position as described above. Blade 18 will now be out of blade channel 16. A plant stem or tree branch may now be placed in angled body channel 14 such that a portion of the stem or branch bisects blade channel 16. With stem 150 or branch properly positioned in body channel 14 across blade channel 16 (see FIG. 13), the individual may press down on thumb lock 86 while maintaining a grip of cutting tool 10 to plunge blade 18 into the stem or branch to cut the plant stem or tree branch. As stated above, angled body channel 14 will cross blade channel 16 at an angle (for example 30°, 45° or 60°) that will create a cut in the stem or branch at an angle (for example 30°, 45° or 60°) to provide optimal surface area for the new growth of a plant or tree in the ground or by grafting to an existing plant or tree. FIG. 15A illustrates a typical stem 150a or branch after being cut with cutting tool 10. FIG. 15B illustrated a stem 150b or branch after being cut with traditional cutting means such as scissors or a knife. The cross-sectional area 152a of stem 150a is much larger than the cross-sectional area 152b of stem 150b. It is the increased cross-sectional area 152a of stem 150a versus the cross-sectional area 152b of stem 150b that will enable more water and nutrients to travel up the stem and reach the outer regions of the plant. This will ensure better growth in stem 150a and better chance of stem 150a flourishing as a new plant versus stem 150b. Cutting tool 10 will enable quick and repeatable cuts to enable a large number of stems or branches to be processed while maintaining the safety of the individual using cutting tool 10. After a sufficient number of stems and branches have been cut, the individual may press blade holder 26 back into trough 20 and slide thumb lock 86 rearward with respect to blade holder 26 and body 12 to secure pin 124 in thumb lock slots 82, 84 and secure cutting tool 10 in a closed position until the next use.

Figure 16:
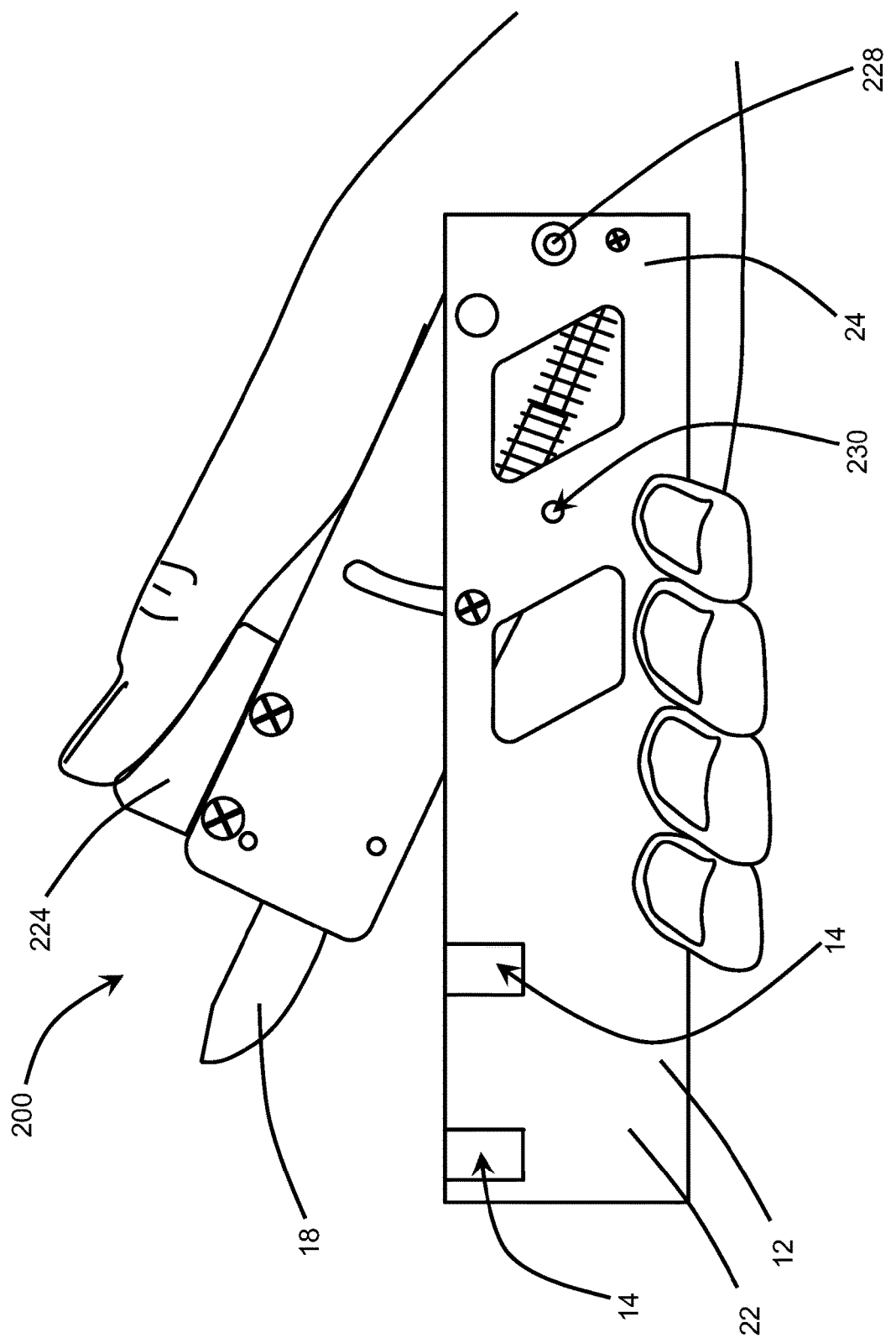
FIG. 16 is a side view of the cutting tool shown in an open position with the cutting tool positioned in a hand according to another embodiment of the present invention.
Figure 17A:
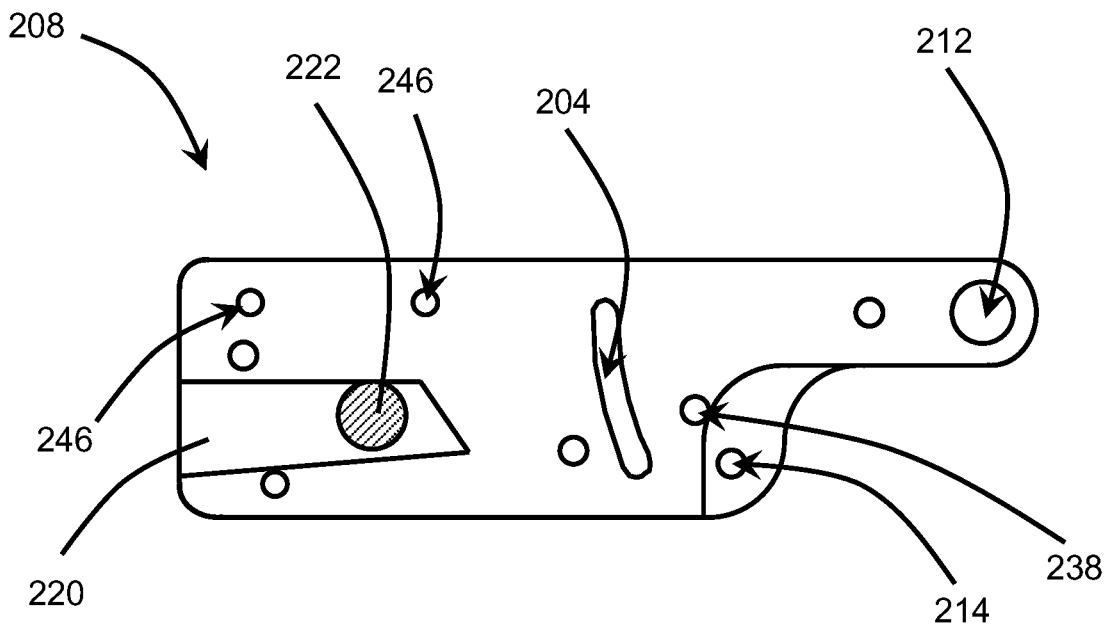
FIGS. 17A and 17B are side views of a first side view according to another embodiment of the present invention.
Figure 17B:
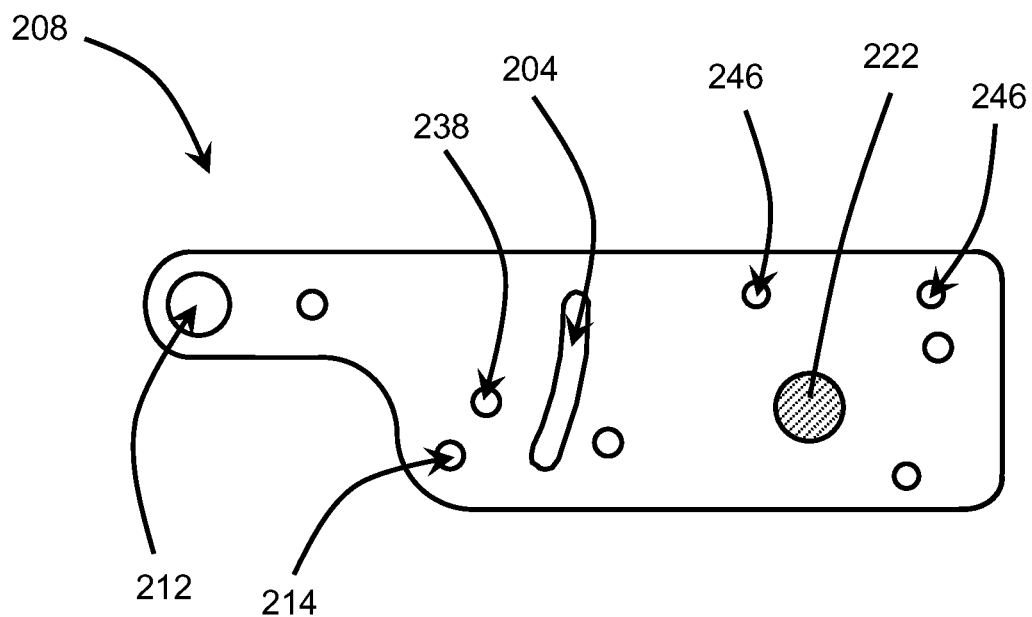
Figure 18A:
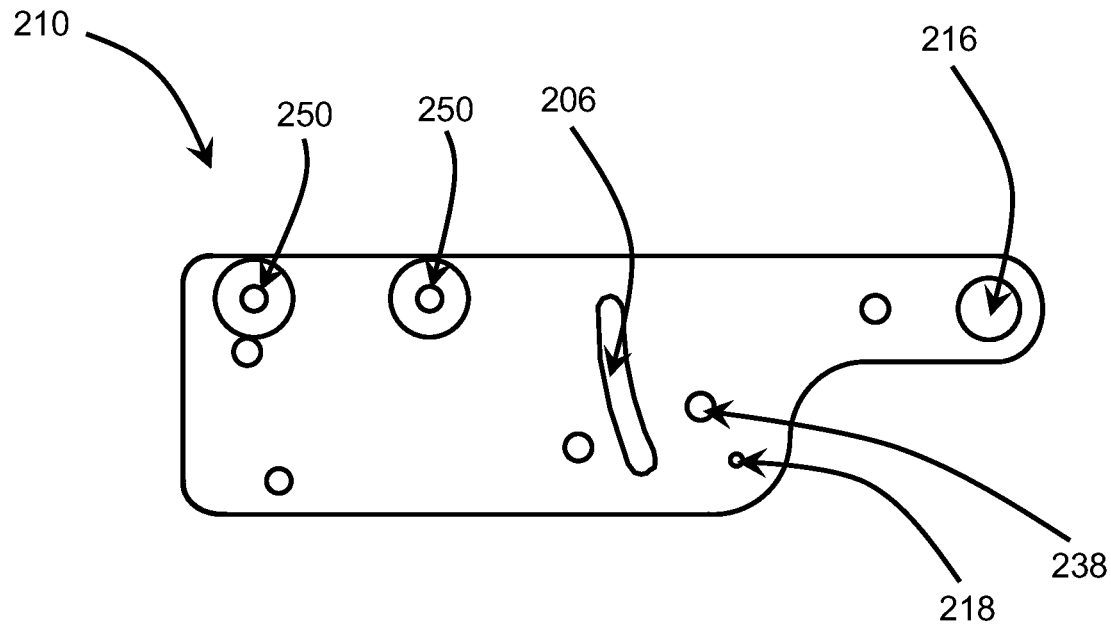
FIGS. 18A and 18B are side views of a second side view according to another embodiment of the present invention.
Figure 18B:
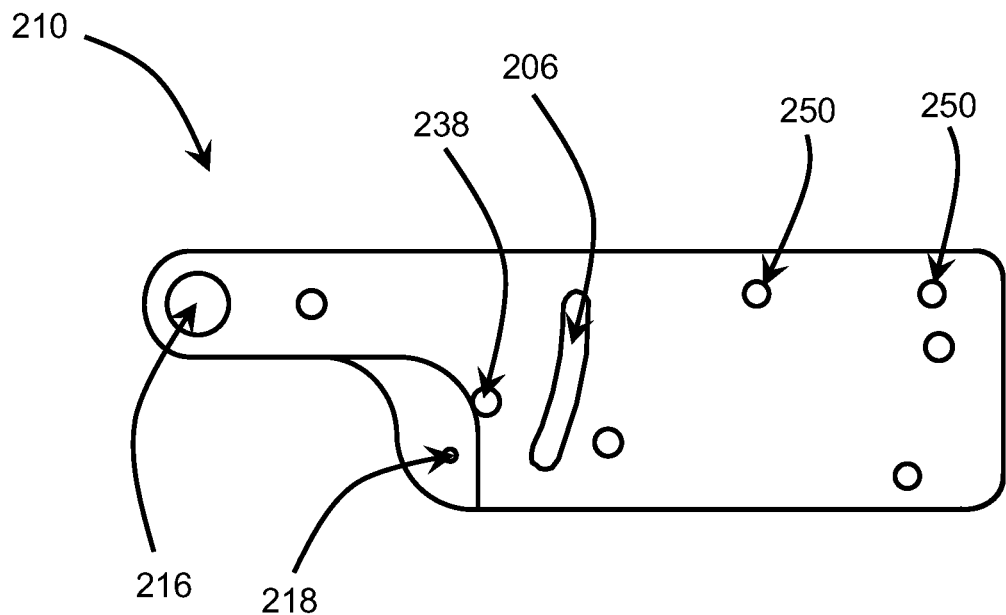
Figure 19:
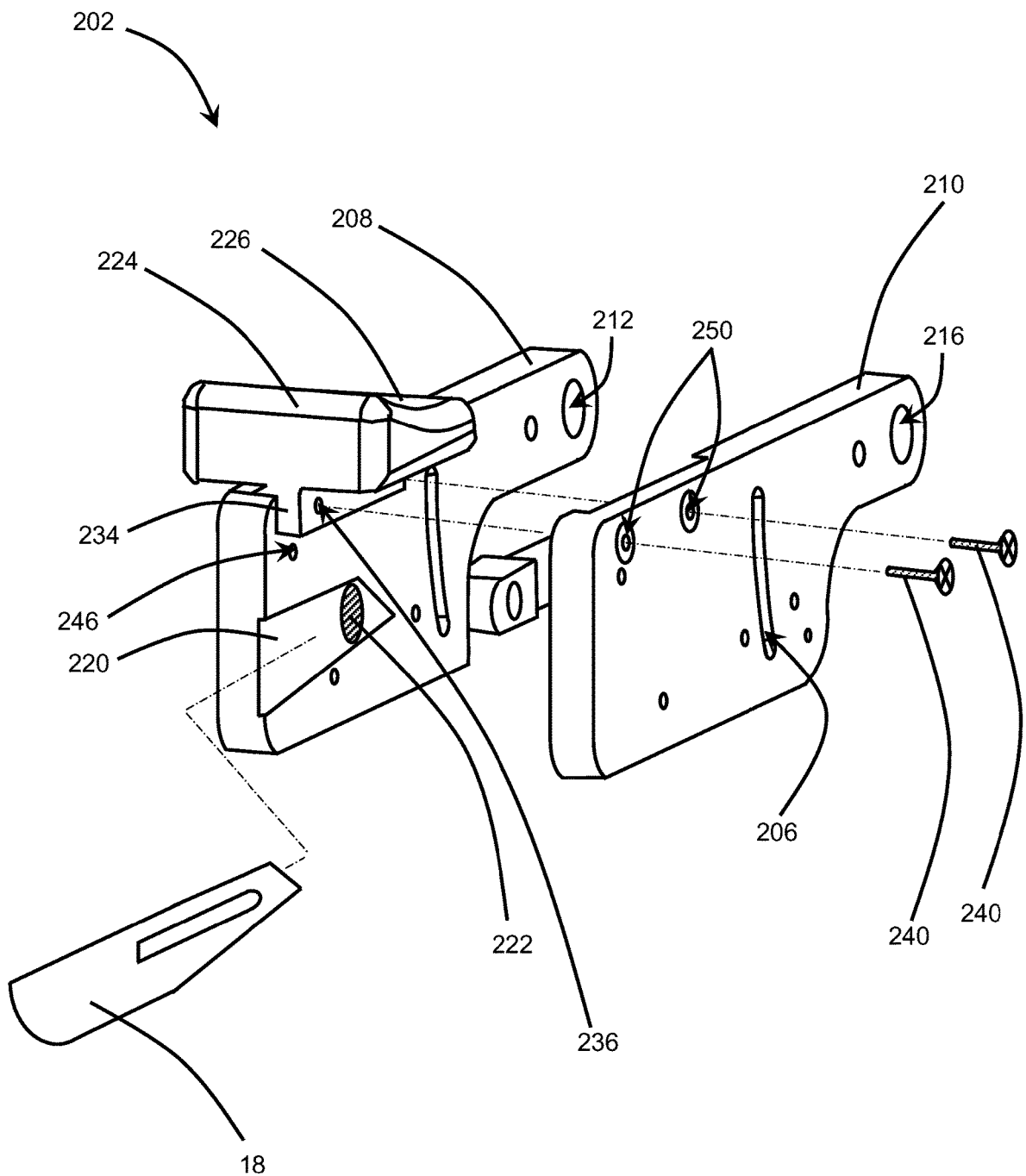
FIG. 19 is a perspective view of the first side, the second side, a thumb guide, the strut assembly and a blade of the blade holder according to another embodiment of the present invention.
Figure 20A:
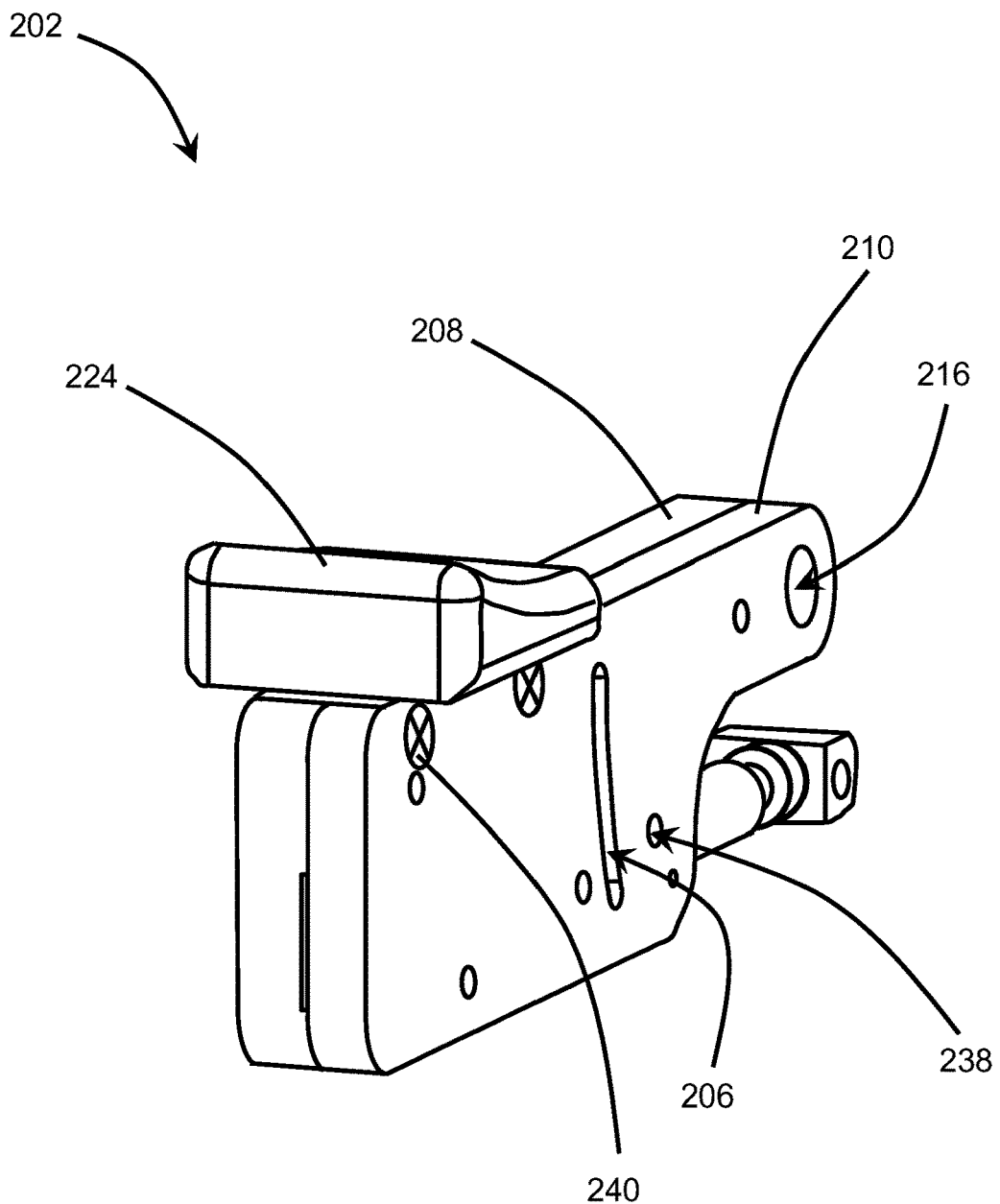
FIGS. 20A-20C are perspective view of the blade holder of the cutting tool according to another embodiment of the present invention.
Figure 20B:
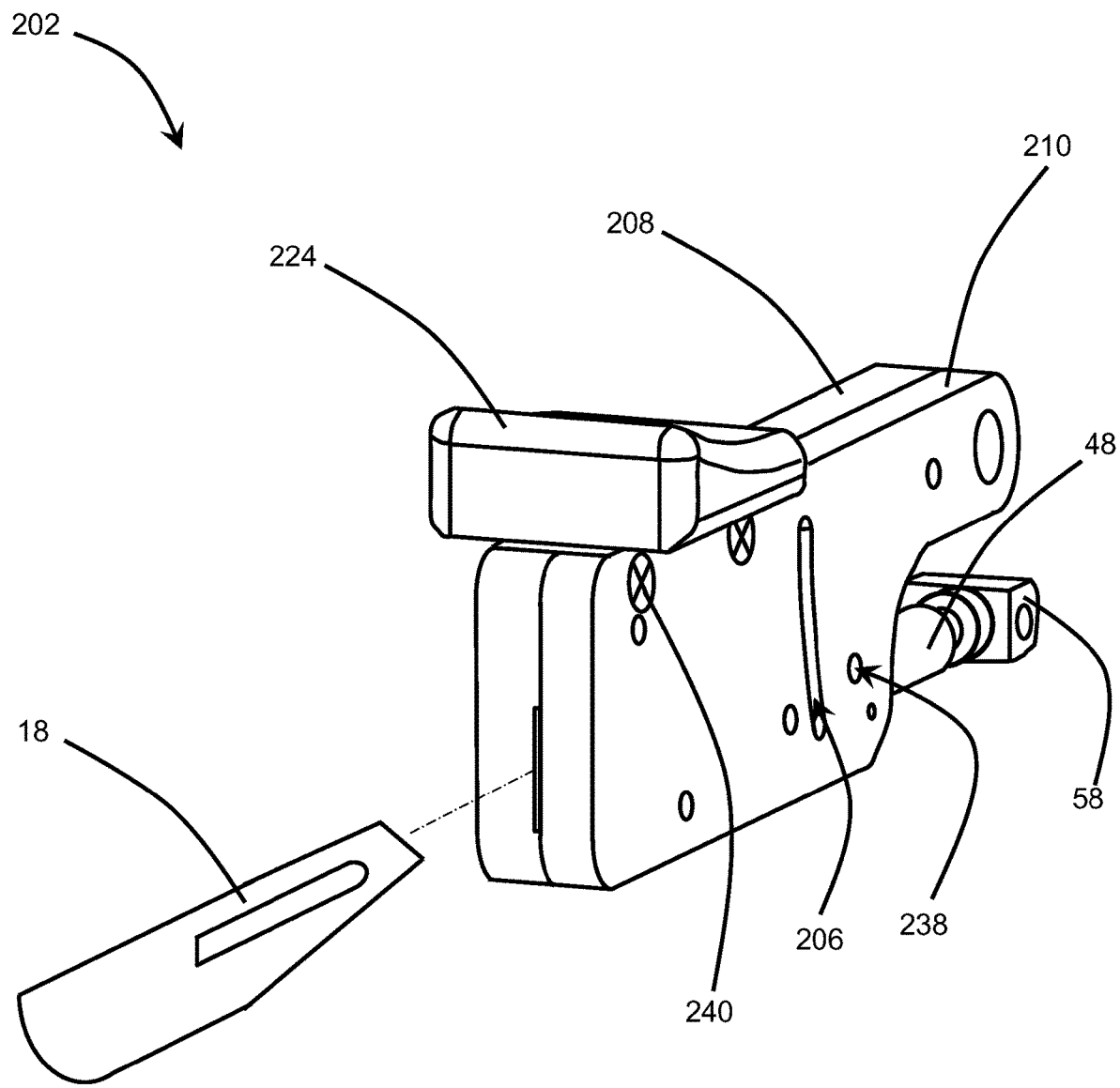
Figure 20C:
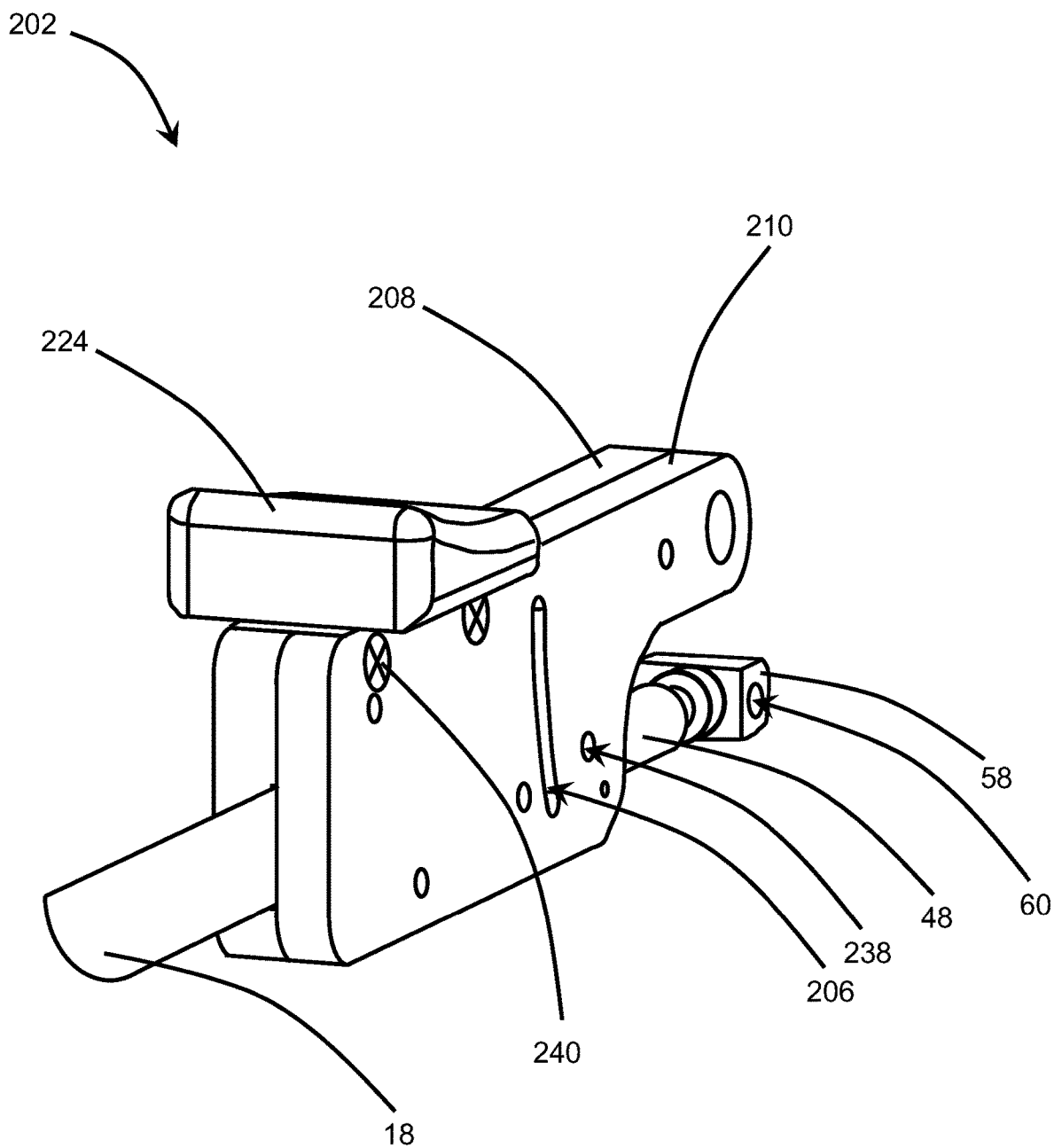
Figure 22:
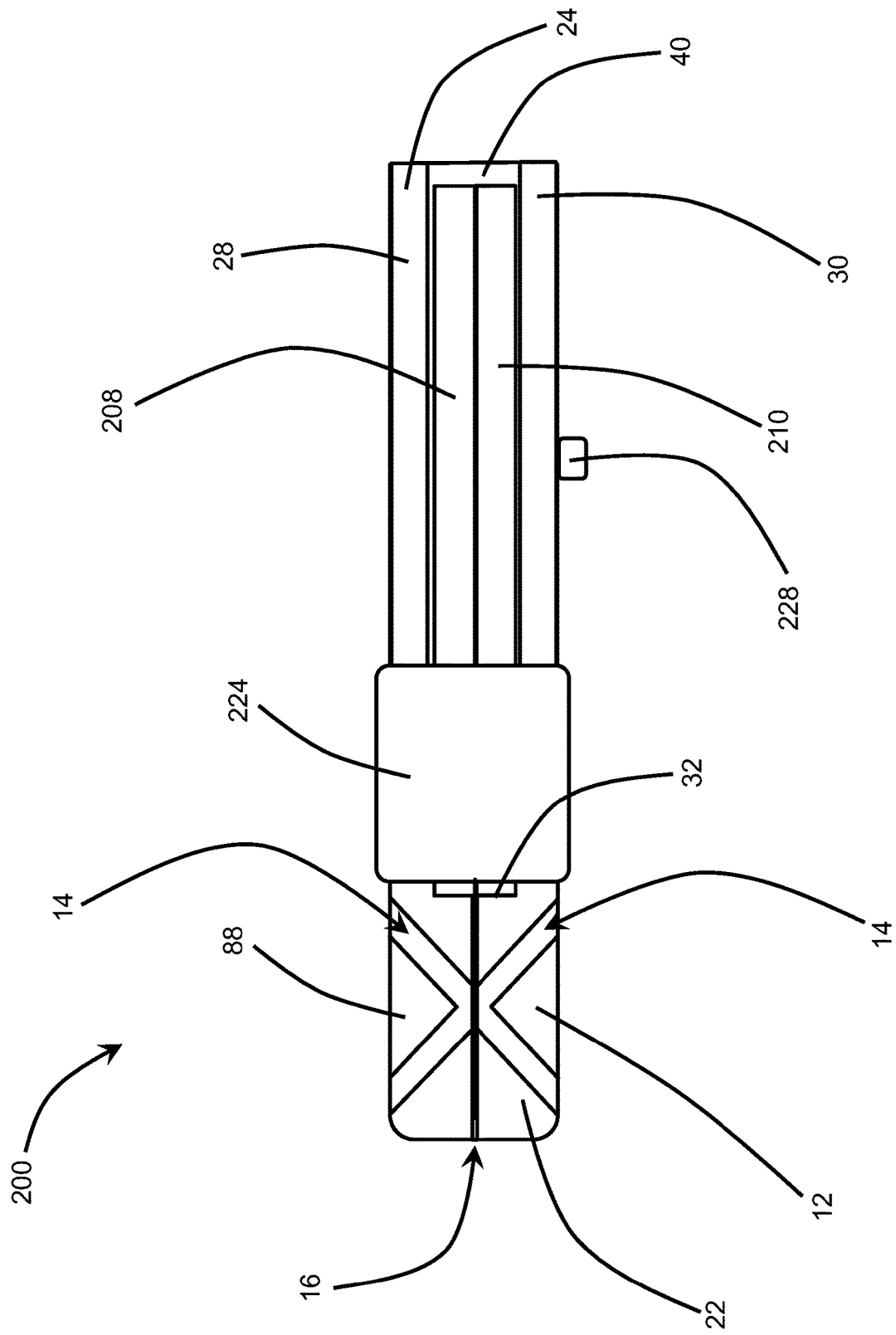
FIG. 22 is a top view of the cutting tool according to another embodiment of the present invention.

An agricultural cutting tool 200 according to another embodiment of the present invention is illustrated in FIG. 16. In this particular embodiment of the present invention, cutting tool 200 includes body 12. Body 12 includes at least one angled body channel 14 that may be sized to capture and position the plant stem or tree branch. Body channel 14 is positioned at front portion 22 of body 12. Body 12 further includes a blade channel 16 (see FIG. 22) that is sized to allow a blade 18 to freely enter and exit blade channel 16. Blade 18 may be any type of cutting-edge blade including but not limited to a knife blade, razor blade, scalpel blade and the like. Blade channel 16 intersects angled body channel 14 at any angle such as, for example, 30°, 45°, 60°, 110° and others, and enables blade 18 to pass though body channel 14 as blade 18 enters and exits blade channel 16. Blade 18 may be used to cut or slice through the plant stem or tree branch positioned in angled body channel 14 (see FIG. 13).

Figure 21A:
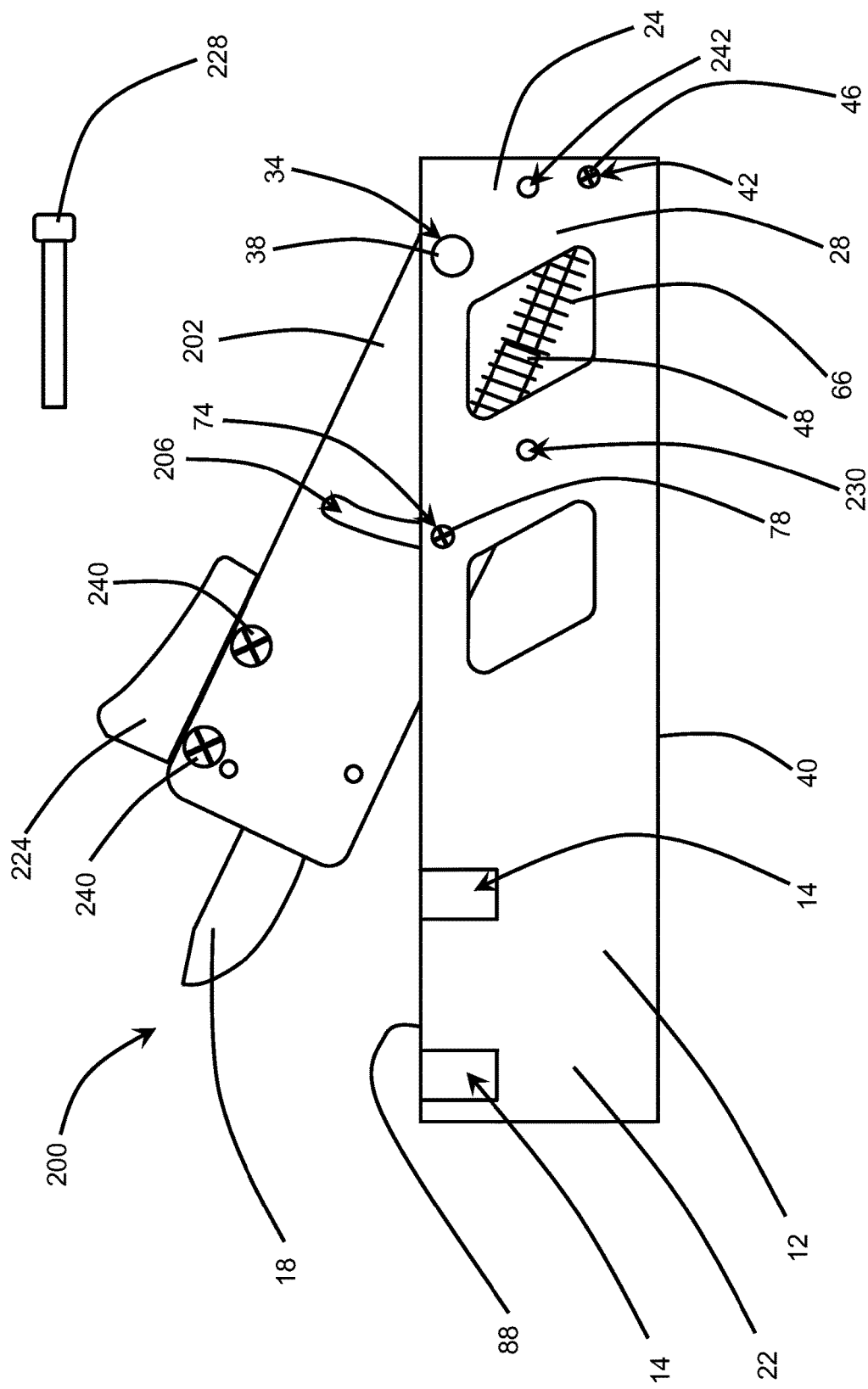
FIG. 21A is a first side view of the cutting tool shown in an open position according to another embodiment of the present invention.
Figure 21B:
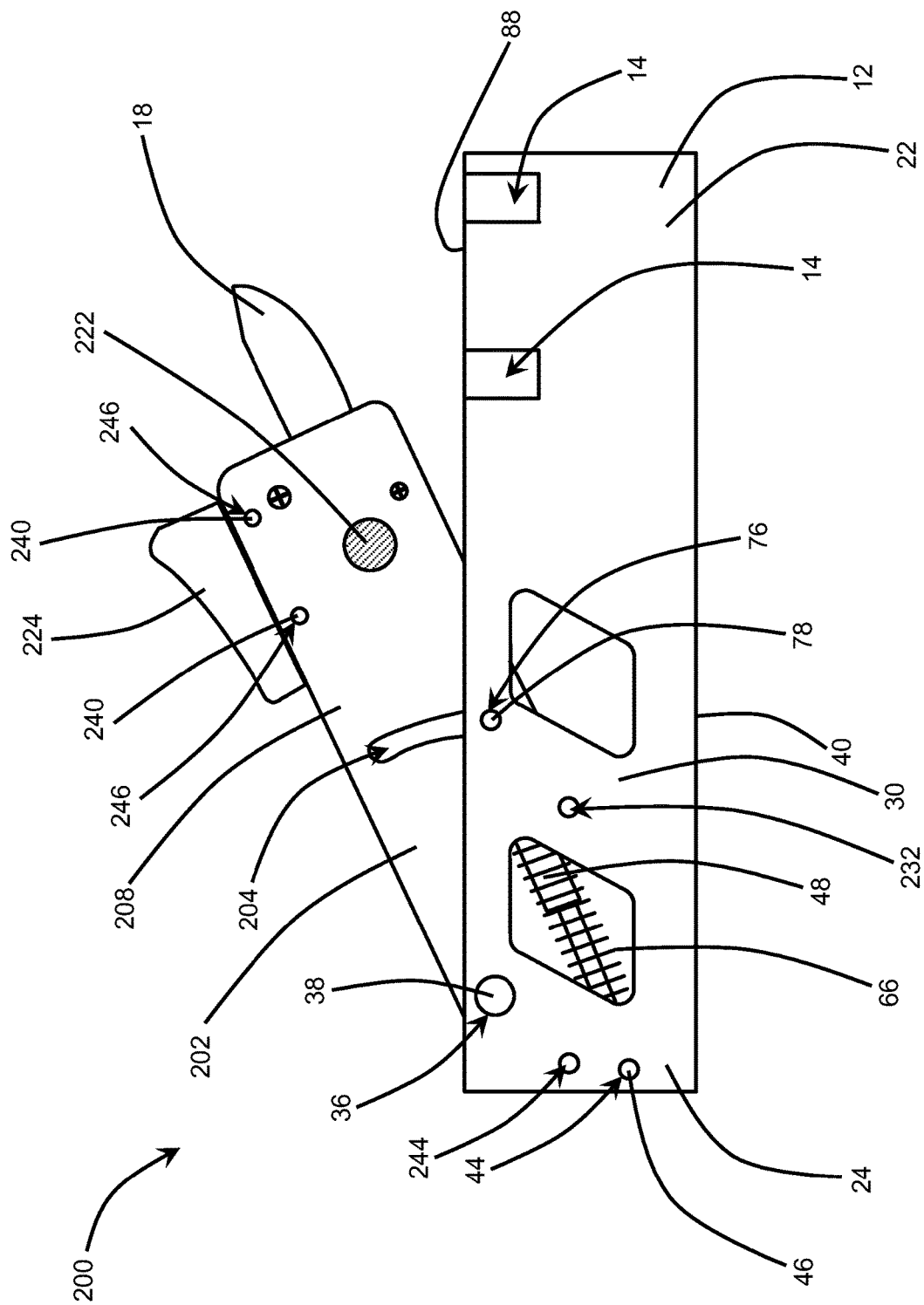
FIG. 21B is a first side view of the cutting tool shown in an open position according to another embodiment of the present invention.
Figure 21C:
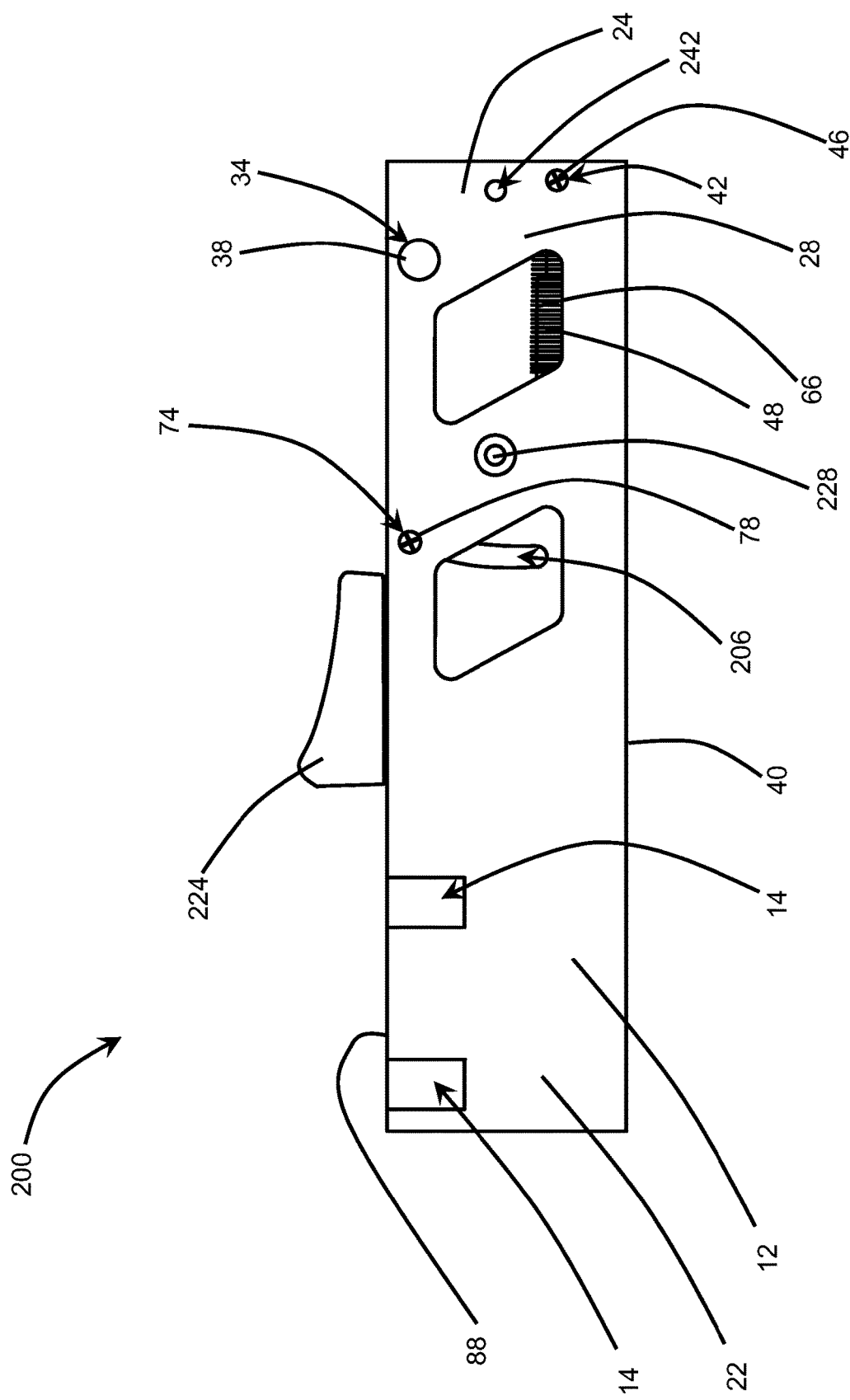
FIG. 21C is a side view of the cutting tool shown in a closed position according to another embodiment of the present invention.

Referring now to FIGS. 21A-21C and as described above, body 12 also includes first wall 28, second wall 30 and a third wall 32 that extend generally upward from base 40. Walls 28, 30 extend from rear portion 24 of body 12 and intersect third wall 32 at front portion 22. Walls 28, 30, 32 cooperatively create a trough 20. Trough 20 extends from rear portion 24 of body 12 to front portion 22. Trough 20 is open at rear portion 24. Trough 20 is sized to position and accept a blade holder 202.

First blade holder pivot point hole 34 of body 12 is positioned near the top of wall 28 and near rear portion 24. First hole 34 extends through wall 28 from an outside of body 12 into trough 20. Second blade holder pivot point hole 36 is positioned near the top of wall 30 and near rear portion 24 of body 12. Second hole 36 extends through wall 30 from an outside of body 12 into trough 20. First hole 34 is aligned with second hole 36 and both holes 34, 36 are sized to accept first pin or screw 38. Holes 34, 36 and pin 38 are configured to cooperatively secure blade holder 202 to body 12. Pin 38 provides a pivot point for blade holder 202 relative to body 12 and enables blade holder 202 to move freely into and out of trough 20.

First lower strut assembly mounting point hole 42 is positioned near base 40 and near rear portion 24 of body 12. First hole 42 extends through wall 28 from an outside of body 12 into trough 20. Second lower strut assembly mounting point hole 44 is positioned near base 40 and near rear portion 24 of body 12. Second hole 44 extends through wall 30 from an outside of body 12 into trough 20. First hole 42 is aligned with second hole 44 and both holes 42, 44 are sized to accept second pin or screw 46. Holes 42, 44 and pin 46 are configured to cooperatively secure strut assembly 48 to body 12.

As described above, strut assembly 48 includes lower strut 50, upper strut 52 and spring 66 as illustrated in FIGS. 3, 5, and 6. Lower strut 50 includes strut shaft 54, spring stop 56 and lower mount 58. Lower mount 58 includes hole 60 that extends a width of lower mount 58 and is sized to accept second pin 46 to secure lower strut 50 and strut assembly 48 to body 12. Upper strut 52 includes spring guide 62 and upper mount 68. Spring guide 62 includes shaft guide hole 64 extending a length of spring guide 62. Inner diameter of shaft guide hole 64 is sized to accept strut shaft 54. Upper mount 68 includes hole 70 that extends a width of upper mount 68 and is sized to accept third pin 72 to secure upper strut 52 and strut assembly 48 to blade holder 202. Pin 72 provides a pivot point for strut assembly 48 relative to blade holder 202 and enables blade holder 202 to move freely into and out of trough 20.

Spring 66 has an inner diameter larger than the outer diameter of spring guide 62 and strut shaft 54 to allow spring to move freely over spring guide 62 and shaft 54. The first end of spring 66 engages spring stop 56 at lower mount 58 and an opposite end of spring 66 engages a surface of upper mount 68 such that spring is captured on strut assembly 48 between spring stop 56 and upper mount 68. Spring 66 is compressed between spring stop 56 and upper mount 68 as a portion of shaft 54 enters shaft guide hole 64 and spring stop 56 moves toward upper mount 68. Spring 66 expands between spring stop 56 and upper mount 68 as a portion of shaft 54 moves out of shaft guide hole 64 and spring stop 56 moves away from upper mount 68. Spring 66 will work to stay in the expanded phase as opposed to being compressed. Furthermore, spring 66, lower strut 50 and upper strut 52 are configured to enable blade holder 202 to remain in a normally open position.

First blade travel stop hole 74 is positioned near the top of wall 28 approximately midway between front portion 22 and rear portion 24 of body 12. First hole 74 extends through wall 28 from an outside of body 12 into trough 20. Second blade travel stop hole 76 is positioned at the top of wall 30 approximately midway between front portion 22 and rear portion 24 of body 12. Second hole 76 extends through wall 30 from an outside of body 12 into trough 20. First hole 74 is aligned with second hole 76 and both holes 74, 76 are sized to accept fourth pin 78. Holes 74, 76 and pin 78 are configured to cooperatively engage slots 204, 206 of blade holder 202 to limit the travel of blade holder 202 into and out of trough 20.

Angled body channel 14 extends through top surface 88 of front portion 22 as shown in FIGS. 1-3, 10A, 10B and 22. Body channel 14 extends from the first side of front portion 22 to the second side of front portion 22 such that an angle is created at blade channel 16. The angle created between angled body channel 14 and blade channel 16 is configured to create a cut angle in the stem or branch that will ensure an adequate surface area in the new stem or branch for optimal growth of a new plant or tree when the freshly cut stem or branch is planted in soil. It is important to note top surface 88 may include multiple channels at varying angles relative to blade channel 16 to provide varying cutting angles in cut stems and branches to ensure the optimal surface area for enabling growth of a new plant or tree.

In this particular embodiment of the present invention, blade holder 202 may be comprised of a first blade holder side 208 and a second blade holder side 210 as illustrated in FIGS. 17A-20C. First side 208 includes a first pivot point hole 212, a first upper strut mount hole 214 and first travel stop pin slot 204. Second side 210 includes a second pivot point hole 216, a second upper strut mount hole 218 and second travel stop pin slot 206. When first side 208 and second side 210 are mated together to form blade holder 202, holes 212, 216, holes 214, 218 and slots 204, 206 are generally in alignment. Holes 212, 216 are configured to align with first blade holder pivot point hole 34 of wall 28 and second blade holder pivot point hole 36 of wall 30 such that pin 38 may be positioned and secured into holes 34, 212, 216, 36 to secure blade holder 202 to body 12. The inner diameter of holes 34, 212, 216, 36 is larger than the outer diameter of pin 38 to allow blade holder 202 to move and pivot relative to body 12.

Upper strut mount holes 214, 218 are configured to align with hole 70 of upper mount 68 such that third pin 72 may be positioned and secured into holes 70, 214, 218 to secure strut assembly 48 to blade holder 206. The inner diameter of holes 70, 214, 218 is larger than the outer diameter of pin 72 to allow blade holder 206 to move and pivot relative to strut assembly 48.

As stated above, slots 204, 206 are configured to align with first blade travel stop hole 74 of wall 28 and second blade travel stop hole 76 of wall 30 such that pin fourth 78 may be positioned and secured in holes 74, 76 while pin 78 is allowed to move freely within slots 204, 206. Slots 204, 206 are generally curved and include a stop at either end of slots 204, 206 to allow blade holder 202 a range of motion into and out of trough 20. The stops help to limit the range of travel for blade holder 202 as it moves into and out of trough 20.

First side 208 of blade holder 202 further includes a recess 220 for positioning blade 18 on blade holder 202. Recess 220 may be of any shape to position the first end of blade 18 to blade holder 202 and prevent blade 18 from moving upward or downward relative to blade holder 202. In this particular embodiment of the present invention, recess 220 includes a magnet 222 configured to secure a metallic blade 18 in recess 220 and blade holder 202. Magnet 222 shall have a magnetic field of sufficient strength or force to secure blade 18 to blade holder 202 while cutting tool 10 is being used to slice or cut plant stems or tree branches. The second end of blade 18 will extend outward from blade holder 202 and be of a thickness less than the width of blade channel 16 to allow blade 18 to enter and exit blade channel 16 as blade holder 202 is moved into and out of trough 20. Blade 18 will be of sufficient sharpness to slice cleanly through any stem or branch positioned in blade channel 16 through angled body channel 14.

Cutting tool 200 further includes a thumb press 224 that is secured to blade holder 202. Thumb press 224 includes a top 226 having a generally trapezoidal shape with a top surface that is generally curved convex from a front edge to a rear edge. Top 226 is sized to allow a typical human thumb to comfortably rest on thumb press 224. Thumb press 224 also includes a stem 234. Stem 234 includes holes 236 configured to accept a fastener such as a pin or screw 240 and to secure thumb press 224 to blade holder 202.

Cutting tool 200 further includes a pin 228 for secure cutting tool 200 in a closed position. Pin 228 may be sized to pass freely through hole 230 of wall 28, hole 232 of wall 30 and hole 238 of blade holder 202. When blade holder 202 is in the closed positioned and seated in trough 40, holes 230, 232 and 238 are in alignment. Pin 228 may be positioned in holes 230, 232 and 238 to lock blade holder 202 in a closed position relative to body 12. Blade 18 will be safely seated in channel 16 for ease of handling cutting tool 200. While blade holder 202 is in the open position and in use, pin 228 may be stored in hole 242 of wall 28 and 244 of wall 30.

In this particular embodiment of the present invention, cutting tool 200 may be assembled in the following manner. Stem 234 of thumb press 224 may be aligned on an inner face of first side 208 of blade holder 202 such that holes 236 of stem align with holes 246 of first side 208. Hole 70 of upper mount 68 of strut assembly 48 may engage third pin 72 extending from first upper strut mount hole 218. With thumb press 224 and strut assembly 48 positioned on the inner face of first side 208, an inner face of second side 210 may be mated to the inner face of first side 208 to secure thumb press 224 and strut assembly 48 to blade holder 202. Holes 236 of stem 234 and holes 246 of first side 208 may be aligned with holes 250 of second side 210 such that screws 240 may be introduced into holes into holes 250, 234 and 246 to secure first side 208, thumb press 224 and second side 210 together. First side 208 and second side 210 may be secured together by other fasteners such as screws, pins and nuts and bolts, glue and the like to create blade holder 202.

Blade holder 202 may be assembled to body 12 by introducing blade holder 202 into trough 20 such that first pivot point hole 212 of first side 208 and second pivot point hole 216 of second side 210 are aligned with first blade holder pivot point hole 34 of first wall 28 and second blade holder pivot point hole 36 of second wall 28. With holes 212, 216, 34, 36 now in alignment, first pin 38 may be press fit into holes 212, 216, 34, 36 to secure blade holder 202 to body 12. Pin 38 will also enable blade holder 202 to rotate about body 12 such that a portion of blade holder 202 may freely enter and exit trough 20.

Further, strut assembly 48 and spring 66 may be secured to body 12 as described above. First lower strut assembly mounting point hole 42 of wall 28 and second lower strut assembly mounting point hole 44 of wall 30 may be aligned with hole 60 of lower mount 58 of mount assembly 48. Second pin 46 may be press fit in holes 42, 44, 60 to secure strut assembly 48 to body 12 and to secure blade holder 202 to body 12 through strut assembly 48 at a second location.

Fourth pin or screw 78 may be press fit into first blade travel stop hole 74 of wall 28 and second blade travel stop hole 76 of wall 30 such that fourth pin 78 passes freely into travel stop pin slots 204, 206 of blade holder 202. Fourth pin or screw 78 may limit the travel of blade holder 202 into and out of trough 20.

Blade 18 may be assembled to cutting tool 200 be placing a first end of blade 18 into recess 220 of first side 208 of blade holder 202. Magnet 222 has a magnetic field of sufficient strength to secure blade 18 to blade holder 202. The second end of blade 18 may extend outward past a front face of blade holder 202 such that a sharpened end of blade 18 may be exposed to engage plant stems or tree branches poisoned in blade channel 16. Blade 18 will be of sufficient sharpness to slice cleanly through any stem or branch positioned in blade channel 16 through angled body channel 14. With blade holder 202, completely assembled, an individual may use their fingers, pliers or any other implement to grasp the blade, apply a sufficient force that is greater than the force of the magnetic field of magnet 222 and remove blade 18 from blade holder 202. An individual may desire to remove blade 18 when blade 18 has become dull after a number of uses. An individual may also desire to remove blade 18 when cutting tool 200 is not in use for safety reasons. The blade may be removed from blade holder 202 as described above and a new blade may be added to blade holder 202 by sliding and end of blade 18 into recess 220 a sufficient depth until the magnetic force of magnet 222 engages blade 18 and secures blade 18 to blade holder 202.

Body 12, first side 208 of blade holder 202 and second side 210 of blade holder 202 may be manufactured of any type of material including metals such as steel, polymers such as plastic and the like. Pins and fasteners may also be manufactured of any type material including metals such as steel, polymers such as plastic and the like.

Cutting tool 200 may be actuated in the following manner. With cutting tool 200 in a closed position, blade holder 202 resting in trough 20, a typical human thumb may engage thumb press 224 at top surface 226 and the remainder of the human hand may grasp cutting tool 200 such that the fingers wrap around an exterior of base 40 to ensure a proper grasp of tool 200 for cutting plant stems and tree branches (see FIG. 16).

The individual may remove pin 228 from cutting tool 200 and the individual may expand their hand and allow spring 66 and strut assembly 48 to rotate blade holder 202 about first pin 38 out of trough 20 and into an open position as described above. Blade 18 will now be out of blade channel 16. A plant stem or tree branch may now be placed in angled body channel 14 such that a portion of the stem or branch bisects blade channel 16. With stem 150 or branch properly positioned in body channel 14 across blade channel 16 (see for example FIG. 13), the individual may press down on thumb press 224 while maintaining a grip of cutting tool 200 to plunge blade 18 into the stem or branch to cut the plant stem or tree branch. As stated above, body channel 14 will cross blade channel 16 at an angle (for example 30°, 45° or 60°) that will create a cut in the stem or branch at an angle (for example 30°, 45° or 60°) to provide optimal surface area for the new growth of a plant or tree in the ground or by grafting to an existing plant or tree. FIG. 15A illustrates a typical stem 150a or branch after being cut with cutting tool 10 (Cutting tool 200 will provide a similar slice in the typical stem 150a or branch after being cut by cutting tool 200). FIG. 15B illustrated a stem 150b or branch after being cut with traditional cutting means such as scissors or a knife. The cross-sectional area 152a of stem 150a is much larger than the cross-sectional area 152b of stem 150b. It is the increased cross-sectional area 152a of stem 150a versus the cross-sectional area 152b of stem 150b that will enable more water and nutrients to travel up the stem and reach the outer regions of the plant. This will ensure better growth in stem 150a and better chance of stem 150a flourishing as a new plant versus stem 150b. Cutting tool 200 will enable quick and repeatable cuts to enable a large number of stems or branches to be processed while maintaining the safety of the individual using cutting tool 10. After a sufficient number of stems and branches have been cut, the individual may press blade holder 202 back into trough 20 and reinsert pin 228 into holes 230, 232 and 238 to lock blade holder 202 in a closed position relative to body 12 until the next use. Blade 18 will be safely seated in channel 16 for ease of handling cutting tool 200.

The present invention has been particularly shown and described with reference to the foregoing embodiment, which is merely illustrative of the best modes presently known for carrying out the invention. It should be understood by those skilled in the art that various alternatives to the embodiment of the invention described herein may be employed in practicing the invention without departing from the spirit and scope of the invention as defined in the following claims. It is intended that the following claims define the scope of the invention and that the method within the scope of these claims and their equivalents be covered thereby. This description of the invention should be understood to include all novel and non-obvious combination of elements described herein, and claims may be presented in this or a later application to any novel non-obvious combination of these elements. Moreover, the foregoing embodiment is illustrative, and no single feature or element is essential to all possible combinations that may be claimed in this or a later application.

What is claimed is:

1. A cutting tool comprising:
    a body, said body including a first wall, a second wall, a third wall, and a base, each of said first wall, said second wall and said third wall extending outward from said base, said first wall, said second wall, said third wall, and said base together define a trough in said body;
    a blade holder in said trough, said blade holder including a first side pivotally engaged to said first wall and a second side pivotally engaged to said second wall;
    a strut assembly in said trough, said strut assembly including a spring, said strut assembly is pivotally engaged with said first and said second sides of said blade holder and pivotally engaged with said first and said second walls of said body;

a blade in said blade holder;

a blade channel in said body and extending through said third wall so as to receive said blade;

at least one angled body channel in said body; and wherein said blade holder is pivotable relative to said body to enable said blade to cut through a plant stem or tree branch present in said blade channel and said at least one angled body channel.

2. The cutting tool as recited in claim 1, wherein said cutting tool further includes a thumb lock, said thumb lock slidably engaged to said blade holder and said thumb lock including a thumb lock retaining pin to pass freely through at least one slot of said body and secure said blade inside of said channel.

3. The cutting tool as recited in claim 1, wherein said cutting tool further includes a thumb press, said thumb press secured to said blade holder.

4. The cutting tool as recited in claim 1, wherein said blade holder includes a first hole and said body includes at least one second hole, said first hole and said at least one second hole in alignment to allow a first pin to pass through said first hole and said at least one second hole thereby securing said blade holder to said body enabling said blade holder to pivot relative to said body.

5. The cutting tool as recited in claim 4, wherein a first end of said strut assembly includes a third hole and said blade holder includes a fourth hole, said third hole and said fourth hole in alignment to allow a second pin to pass through said third hole and said fourth hole thereby securing said strut to said blade holder enabling said blade holder to pivot relative to said strut assembly.

6. The cutting tool as recited in claim 5, wherein a second end of said strut assembly includes a fifth hole and said body includes at least one sixth hole, said fifth hole and said at least one sixth hole in alignment to allow a third pin to pass through said fifth hole and said at least one sixth hole thereby securing said strut to said body thereby enabling said body to pivot relative to said strut assembly.

7. The cutting tool as recited in claim 1, wherein said spring of said strut assembly is biased to force said blade outside of said blade channel.

8. The cutting tool as recited in claim 1, wherein said blade holder includes:

a recess, said recess sized to accept said blade, and said recess including an elongated alignment extrusion, said elongated alignment extrusion sized to engage a slot of said blade; and a blade cover to position and secure said blade in said recess and to said blade holder.

9. The cutting tool as recited in claim 1, wherein said blade holder includes:

a recess, said recess sized to accept said blade; and a magnet to position and secure said blade in said recess and to said blade holder.

10. The cutting tool as recited in claim 1, wherein said cutting tool further includes a pin, said pin sized to pass freely through a hole of said blade holder and holes of said body when said hole of said blade holder is aligned with said holes of said body to secure said blade inside said channel.

11. The cutting tool as recited in claim 1, wherein said at least one angled body channel is situated in said body such that said blade channel intersects said at least one angled body channel.

* * * * *